United States Patent
Masuda

(10) Patent No.: US 7,593,150 B2
(45) Date of Patent: Sep. 22, 2009

(54) DIFFRACTION OPTICAL ELEMENT, LIGHT BEAM DETECTION DEVICE, OPTICAL SCANNER AND IMAGE FORMING APPARATUS

(75) Inventor: Koji Masuda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/167,665

(22) Filed: Jul. 3, 2008

(65) Prior Publication Data

US 2009/0009838 A1    Jan. 8, 2009

(30) Foreign Application Priority Data

Jul. 4, 2007    (JP) ............... 2007-176459

(51) Int. Cl.
*G02B 26/08* (2006.01)

(52) U.S. Cl. .................... 359/205.1; 359/558

(58) Field of Classification Search ............. 359/204.5, 359/205.1, 558, 563, 566, 568
See application file for complete search history.

(56) References Cited

U.S. PATENT DOCUMENTS

| | | |
|---|---|---|
| 5,583,557 A | 12/1996 | Yamamoto et al. |
| 5,875,051 A | 2/1999 | Suzuki et al. |
| 6,069,724 A | 5/2000 | Hayashi et al. |
| 6,075,638 A | 6/2000 | Masuda |
| 6,081,386 A | 6/2000 | Hayashi et al. |
| 6,384,949 B1 | 5/2002 | Suzuki |
| 6,456,314 B1 | 9/2002 | Masuda |
| 6,462,879 B2 | 10/2002 | Masuda |
| 6,496,214 B1 | 12/2002 | Masuda et al. |
| 6,686,946 B2 | 2/2004 | Masuda et al. |
| 6,717,606 B2 | 4/2004 | Masuda |
| 6,724,414 B2 | 4/2004 | Masuda et al. |
| 6,900,939 B2 * | 5/2005 | Hoshi et al. ............ 359/566 |
| 7,068,295 B2 | 6/2006 | Masuda |
| 2005/0067944 A1 | 3/2005 | Masuda et al. |
| 2005/0093963 A1 | 5/2005 | Masuda |
| 2006/0114566 A1 * | 6/2006 | Ohmori et al. ............ 359/566 |
| 2006/0256183 A1 | 11/2006 | Masuda |
| 2007/0146473 A1 | 6/2007 | Masuda |
| 2008/0084594 A1 | 4/2008 | Masuda |

FOREIGN PATENT DOCUMENTS

| | | |
|---|---|---|
| JP | 3191232 | 5/2001 |
| JP | 2005-37575 | 2/2005 |
| JP | 2005-62597 | 3/2005 |
| JP | 2008-76658 | 4/2008 |

OTHER PUBLICATIONS

U.S. Appl. No. 12/165,850, filed Jul. 1, 2008, Masuda.

* cited by examiner

*Primary Examiner*—Euncha P Cherry
(74) *Attorney, Agent, or Firm*—Oblon, Spivak, McClelland, Maier & Neustadt, L.L.P.

(57) ABSTRACT

An optical element for diffracting a light beam includes a diffractive surface having a one-dimensional periodic structure. The periodic structure and transmissive diffraction efficiencies T'p(m) and T's(m) of p- and s-polarized lights on the diffractive surface in relation to a diffraction order m satisfy the following conditions:

$$0.5\lambda < P < 1.5\lambda \quad (1)$$

$$|\{T'p(m)-T's(m)\}/\{T'p(m)+T's(m)\}| < 0.1, \quad (2)$$

where P is a period of the periodic structure, and $\lambda$ is a wavelength of the used light beam.

10 Claims, 23 Drawing Sheets

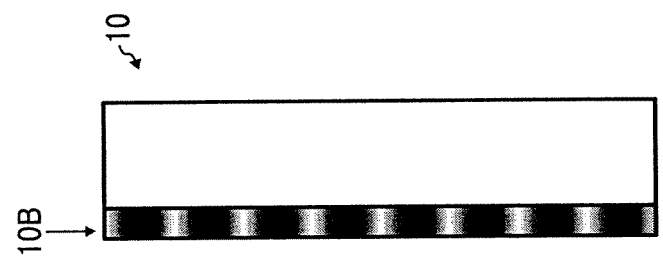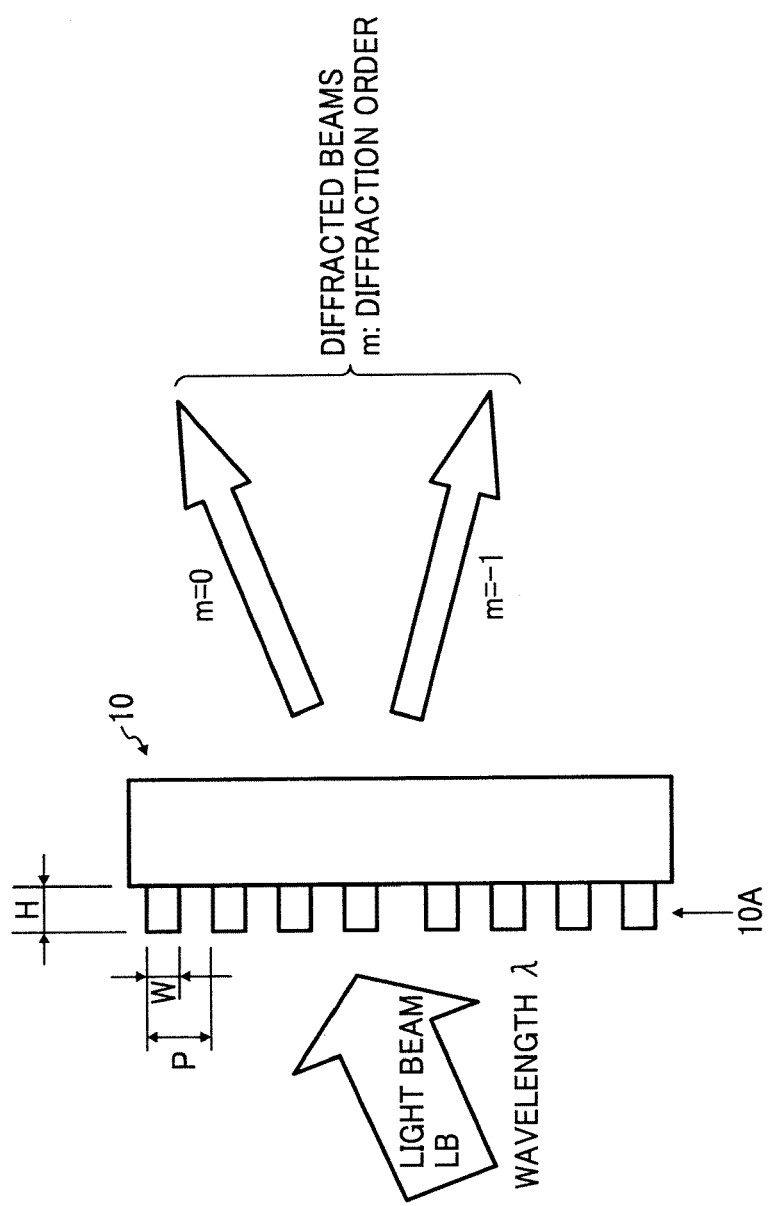

$|\{Tp(m)-Ts(m)\}/\{Tp(m)+Ts(m)\}|$ $|\{T(0)-T(-1)\}/\{T(0)+T(-1)\}|$

DIFFRACTION OPTICAL ELEMENT, LIGHT BEAM DETECTION DEVICE, OPTICAL SCANNER AND IMAGE FORMING APPARATUS

CROSS REFERENCE TO RELATED APPLICATIONS

The present application is based on and claims priority from Japanese Application Number 2007-176459, filed on Jul. 4, 2007, the disclosure of which is hereby incorporated by reference herein in its entirety.

BACKGROUND OF THE INVENTION

1. Field of the Invention

The present invention relates to a diffraction optical element and a light beam detection device, an optical scanner, and an image forming apparatus. The present invention can be applied in a digital copying machine, a printer, a facsimile device, a plotter, a digital complex machine such as a device including a hybrid function of a copying function, a facsimile function, a printer function, a plotter function, a scanning function, and the like, and a measuring device.

2. Description of the Related Art

The diffraction optical element is known as an optical element to separate a light beam by diffraction phenomenon and used in various optical devices. In general, to separate the light beam, it is necessary that the separated beams have a large separation angle therebetween. As is generally known, in a periodic structure having a diffractive surface, since a diffraction angle becomes large when a period of the periodic structure becomes small, the light beam can be separated with the large separation angle by adjusting the period of the periodic structure. However, when the period of the periodic structure is too small, deflection dependency due to structure birefringence occurs.

That is, in the diffraction optical element having the periodic structure with the period of about a wavelength of the light beam to be separated by the diffraction, the large separation angle can be achieved while the deflection dependency due to the structure birefringence occurs.

The light beam emitted into the diffraction optical element is generally in various deflected states, and if there is the deflection dependency due to the structure birefringence, the deflected state of the incident light beam generally differs from that of the separated beam. Even when the incident light beam is in a linear deflected state, except when a deflected direction is parallel or perpendicular to a period direction, the separated beam is generally in an elliptically deflected state.

Furthermore, in the case where the incident light is in an elliptically deflected state, each of the separated beams is in an elliptically deflected state different from the deflected state of the incident light beam.

The diffraction optical element is preferably a diffraction optical element which can separate the light beam regardless of the deflected state of the incident light beam, for example, can separate the light independently from the deflected state of the incident light beam.

For example, the diffraction optical element can be used in an optical scanner in which a light beam emitted from a semiconductor laser is deflected by a light deflection unit or a light deflector and scans a surface to be scanned to perform an optical writing, and can be used to detect the light beam to adjust a scanning position. In this case, in the optical scanner in which the light beam emitted from the semiconductor laser is not linearly deflected parallel or perpendicular to a deflected scanned plane which is a virtual plane where the light beam deflected by the light deflector is swept or in the optical scanner which has a reflection mirror reflecting the light beam to an outside of the deflected scanned plane, the deflected state of the light beam is gradually varied by the reflection and the light beam to be detected is generally in an elliptically deflected state.

In addition, even when an optical scanner is configured such that the light beam to be deflected is maintained in a linear deflected state in a light path, it is possible that the light beam becomes in an elliptically deflected state due to variations occurring in production of the semiconductor laser, errors occurring in mounting the semiconductor laser on the optical scanner, or errors in installing the light deflection unit or optical elements. Furthermore, if errors in attaching the reflection mirror or the optical element to which the elliptically-deflected light beam is emitted occur, the elliptically deflected state is varied in accordance with the errors.

Therefore, it is required that the diffraction optical element to which the light beam is emitted can be adjusted and used to separate the incident light beam in any deflected states.

In addition, such a diffraction optical element can be used regardless of the deflected state of the light beam so that the diffraction optical element can be commonly-used in the various optical devices and the low cost optical devices can be obtained.

Various detection methods to detect the light beam used to scan the surface to be scanned in the optical scanner are disclosed in, for example, Japanese Patent Application Publication Numbers 2005-37575, 2005-62597 and Japanese Patent Number 3191232.

SUMMARY OF THE INVENTION

An object of the present invention is to provide a diffraction optical element which can separate a light beam with a large separation angle and can be used to separate the light beam in any deflected states.

To achieve the above object, an optical element to diffract a light beam, includes a diffractive surface having a one-dimensional periodic structure; wherein the periodic structure and transmissive diffraction efficiencies T'p(m) and T's(m) of p- and s-polarized lights on the diffractive surface in relation to a diffraction order m satisfy the following conditions:

$$0.5\lambda < P < 1.5\lambda \tag{1}$$

$$|\{T'p(m)-T's(m)\}/\{T'p(m)+T's(m)\}| < 0.1, \tag{2}$$

where P is a period of the periodic structure, and $\lambda$ is a wavelength of the used light beam.

BRIEF DESCRIPTION OF THE DRAWINGS

FIG. 1A is an explanatory view illustrating a diffraction optical element according to an embodiment of the present invention.

FIG. 1B is an explanatory view illustrating a diffraction optical element according to an embodiment of the present invention.

DETAILED DESCRIPTION OF THE PREFERRED EMBODIMENTS

Figure 2:
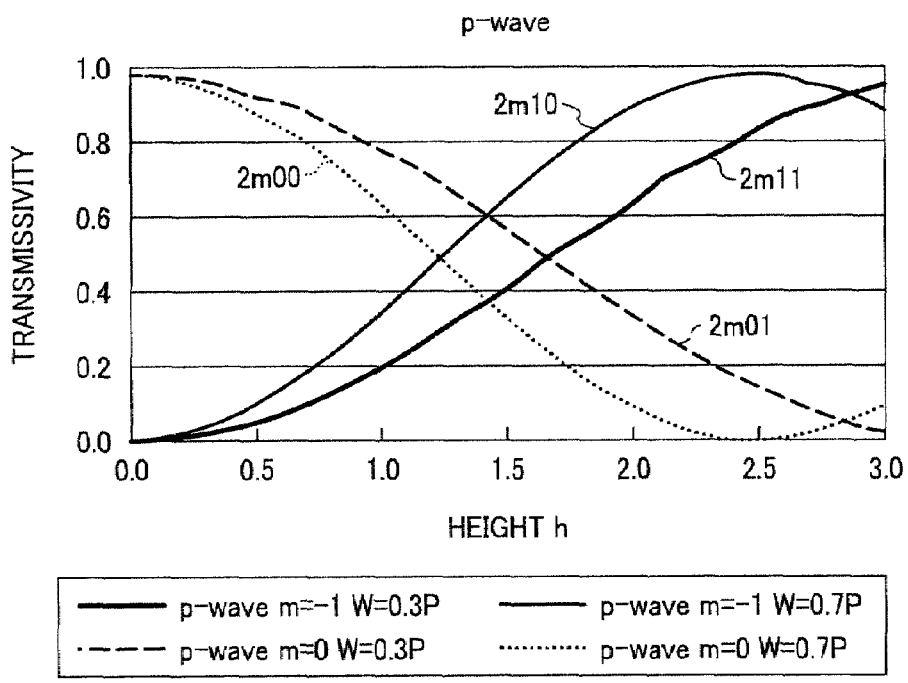
FIG. 2 is an explanatory view illustrating a calculation example 1 with respect to the diffraction optical element according to an embodiment of the present invention.

Preferred embodiments of the present invention will be explained in detail with reference to the accompanying drawings below.

FIGS. 1A and 1B are views each illustrating a diffraction optical element according to a first embodiment of the present invention.

As shown in FIG. 1A, an optical element 10 according to this embodiment of the present invention, which diffracts a light beam LB, includes a diffractive surface 10A having a one-dimensional periodic structure. The periodic structure and transmissive diffraction efficiencies T'p(m) and T's(m) of p-polarized light and s-polarized light on the diffractive surface 10A in relation to a diffraction order m satisfy the following conditions:

$$0.5\lambda < P < 1.5\lambda \quad (1)$$

$$|\{T'p(m) - T's(m)\}/\{T'p(m) + T's(m)\}| < 0.1, \quad (2)$$

where P is a period of the periodic structure, and λ is a wavelength of the used light beam LB. The p-polarized light and the s-polarized light are parallel to the diffractive surface 10A, the p-polarized light is directed in a direction along the periodic structure of the diffractive surface 10A and the s-polarized light is perpendicular to the periodic structure.

The diffraction optical element 10 may be formed in a plate-like form having parallel flat-surfaces and transparent with respect to a wavelength of the used light beam. The diffractive surface 10A is, for example, provided on one side of the diffraction optical element 10.

As mentioned above, the diffractive surface 10A has the one-dimensional periodic structure. In other words, the structure periodically varies in a predetermined direction (upward and downward directions of FIGS. 1A and 1B). As an example, the structure is a one-dimensional diffraction grating. The varied structure is obtained by a varied surface structure provided on the diffractive surface 10A, a varied refractive index of the diffractive surface, or the like. In the one-dimensional periodic structure, the structure is periodically repeated in one direction, and the direction is referred to as a "period direction".

On the diffractive surface 10A, a cross-sectional shape or form of the structure is uniform in a direction perpendicular to the period-direction. For example, in a case where the one-dimensional periodic structure is a relief structure having a rectangular wave form in section, projections of the relief structure extend in the direction perpendicular to the period-direction, and the cross-sectional form of the relief structure in a plane which is perpendicular to the diffractive surface 10A and includes the period-direction.

In the following explanations, the light beam LB emitted into the diffraction optical element 10 is referred to as a "light beam", the "incident light beam", or the "used light beam". The light beam diffracted by the diffraction optical element is referred to as "beams", "diffracted beams", or the "separated beams". That is, the light beam emitted into the diffraction optical element 10 is diffracted and separated into a plurality of diffracted beams.

The above condition (1) means that the period P of the periodic structure in the period direction is in a range between 0.5 and 1.5 times of a wavelength $\lambda$ of the used light beam LB, that is, the period P is about the wavelength $\lambda$ of the used light beam LB. Since the period P of the periodic structure is about the wavelength $\lambda$ of the used light beam LB, the diffraction optical element 10 according to an embodiment of the present invention can separate the light beam LB into a plurality of diffracted beams with a large separation angle.

The above condition (2) means that the separated beams with the diffraction order m (m=0, 1, 2 ...) are not substantially affected by a deflected state of the incident light beam LB.

The light beam LB having the wavelength $\lambda$ is emitted into the diffractive surface 10A in a plane parallel to the upward or downward direction of FIG. 1A. The light beam LB is, for example, a laser light beam emitted from a semiconductor laser. For the sake of simplification, the light beam is explained as a parallel light flux.

When an incident angle of the light beam LB is $\theta$ and the beam diffracted by the diffractive surface 10A with the diffraction order m is $\theta d(m)$, a diffraction is represented as the following equation:

$$\sin\theta + m\lambda/P = N\sin\theta d(m) \quad (11)$$

where N is a refractive index of a material of the diffraction optical element.

The respective diffracted beam is refracted on a surface opposite to the diffractive surface 10A of the diffraction optical element 10 and emitted from the diffraction optical element 10. When a refraction angle of each diffracted beam is $\theta t(m)$, the following equation is obtained based on Snell's law:

$$N\sin\theta d(m) = \sin\theta t(m) \quad (12)$$

From the above equations (11) and (12), the following equation with respect to the light beam which is emitted to the diffraction optical element 10 with the incident angle $\theta$, diffracted with the diffraction order m and emitted from the diffraction optical element 10 is obtained:

$$\sin\theta + m\lambda/P = N\sin\theta d(m) = \sin\theta t(m) \quad (13)$$

Transmissivity of each beam transmitted through the diffraction optical element 10 is represented by a product of transmissive diffraction efficiency on the incident diffractive surface 10A and Fresnel transmissivity on the exit surface opposite to the diffractive surface 10A.

The transmissivity of the beam diffracted on the diffractive surface 10A with the diffraction order m when the beam is transmitted through the diffraction optical element 10 is T(m). The value of "(the transmissive diffraction efficiency on the diffractive surface 10A)×(the Fresnel transmissivity on the opposite surface)" is varied depending on a deflected direction of the incident light beam LB emitted into the diffraction optical element 10. Accordingly, when the transmissivities of a p-polarized light component and a s-polarized light component are Tp(m) and Ts(m), respectively, the transmissivity T(m) is obtained by the following equation:

$$T(m) = \{Tp(m) + Ts(m)\}/2.$$

That is to say, the transmissivity T(m) is an average transmissivity in relation to the transmissivities Tp(m) and Ts(m) of the p-polarized light and the s-polarized light.

In this embodiment, in order to provide detailed or specific explanation, the following case will be explained, that is, a case where the light beam LB is diffracted only with m=0 and m=−1 and separated into two diffracted beams (0-order light and −1-order light) and the incident angle $\theta$ of the light beam LB is an angle $\theta_0$ which satisfies the so-called Bragg condition:

$$\sin\theta_0 = \lambda/2P.$$

In the above condition, since the diffracted beam with m=−2 is not formed, there is not an refraction angle with m=−2, which is the refraction angle $\theta t(-2)$ satisfying the following equation:

$$\sin\theta_0 - 2\lambda/P = \sin\theta t(-2).$$

Consequently, the following equations are obtained:

$$\sin\theta_0 - 2\lambda/P = \lambda/2P - 2\lambda/P = -3\lambda/2P < -1,$$

and then, $$P < 3\lambda/2 \quad (14)$$

Similarly, since the diffracted beam with m=+1 is not formed, there is not an refraction angle with m=+1, which is the refraction angle $\theta t(+1)$ satisfying the following equation:

$$\sin\theta_0 + \lambda/P = \sin\theta t(+1).$$

Consequently, the following equations are obtained:

$$\sin\theta_0 + \lambda/P = \lambda/2P + \lambda/P = 3\lambda/2P > 1,$$

and then, $$P < 3\lambda/2. \quad (15)$$

On the other hand, since the diffracted beam with m=−1 is formed, the following equations are obtained;

$$\sin\theta_0 - \lambda/P = \lambda/2P - \lambda/P = -\lambda/2P = \sin\theta t(-1) > -1$$

and then, $$P > \lambda/2 \quad (16)$$

From the above equations (14) to (16), when the incident angle $\theta$ is $\theta_0$, the period P of the one-dimensional periodic structure, which is required to allow the light beam LB to be diffracted only with m=0 and m=−1 is in the following range in relation to the wavelength $\lambda$ of the light beam LB:

$$0.5\lambda < P < 1.5\lambda \quad (17)$$

When the period P is set to be about the wavelength of the incident light beam LB or comparable with the wavelength of the incident light beam LB, a large diffraction angle can be obtained to separate effectively the diffracted beams. In addition, by adjusting the period P, the angle between the two separated beams, that is, the separation angle can be modified so that the two beams having the appropriate separation angle therebetween according to layout of the optical systems can be obtained.

As mentioned above, in the diffraction optical element according to an embodiment of the present invention, the used light beam LB is separated into two diffracted beams by use of the diffraction orders of m=0 and −1.

In the above explanation, although the equation (17) is derived by use of the Bragg condition, the incident angle $\theta$ of the light beam is not limited to the angle $\theta_0$ satisfying the Bragg condition. If the period P is set to be comparable with the wavelength of the incident light beam, the large diffraction angle in relation to that in the conventional diffraction optical element, that is, in relation to the period of a few μm to a few hundred μm. Accordingly, in this embodiment, the incident angle $\theta$ is not limited to $\theta_0$.

If the incident angle $\theta$ is a generally-used angle ($\theta \neq 0$) and the light beam is diffracted only with m=0 and m=−1, since the diffracted beam with m=−2 is not formed, the following equation (18) is obtained:

$$\sin\theta - 2\lambda/P = \sin\theta t(m) < -1 \quad (18)$$

and since the diffracted beam with m=+1 is not formed, $$\sin\theta + \lambda/P > 1 \quad (19)$$

Here, for convenience of explanation, if a function to select a minimum value from a plurality of real numbers A1, A2, A3, ... is defined by the following equation:

$$\min\{A1, A2, A3, ...\} = A1 (\text{when } A1 \leq A2, A3, ...)$$
$$= A2 (\text{when } A1 > A2, A2 \leq A3, ...)$$
$$= ...$$
$$= Ai (\text{when } Ai \leq A1, A2, ..., Ai-1, Ai+1, ...)$$
$$= ...$$

a range of the period P to satisfy the above equations (18), (19) is represented as follows:

$$P < \min\{2\lambda/(\sin\theta+1), \lambda/(1-\sin\theta)\} \quad (20)$$

Furthermore, since the −1-order diffracted beam is formed and the refraction angle $\theta t(-1)$ exists, the following equations are obtained:

$$0 > \sin\theta - \lambda/P > -1 \quad (21)$$

and therefore, $$\lambda/(1+\sin\theta) < P < \lambda/\sin\theta \quad (22)$$

In addition, since the following equation (23) is satisfied;

$$2\lambda/(\sin\theta+1) < \lambda/\sin\theta \quad (23)$$

the period P is required to be set in the following range in relation to the wavelength $\lambda$ of the light beam LB to allow the light beam LB is diffracted only with m=0 and m=−1:

$$\lambda/(1+\sin\theta) < P < \min\{2\lambda/(\sin\theta+1), \lambda/(1-\sin\theta)\}.$$

For example, when $\theta$=30 degrees, $$2\lambda/3 < P < 4\lambda/3$$

that is, $$0.67\lambda < P < 1.33\lambda.$$

When $\theta$=60 degrees, $$2\lambda/(2+\sqrt{3}) < P < 4\lambda/(2+\sqrt{3})$$

that is, $$0.54\lambda < P < 1.07\lambda.$$

The more the incident angle $\theta$ comes close to $\theta_0$ satisfying the following Bragg condition, the larger the range of the period P, which is obtained by the above equation (1) is:

$$\sin\theta_0 = \lambda/2P. \quad (3)$$

According to an embodiment of the present invention, it is preferable that the used light beam LB is emitted into the diffractive surface 10A with the incident angle of about the angle $\theta_0$ in relation to the diffractive surface 10A and the angle $\theta_0$ satisfies the above condition (3).

As mentioned above, when a fine periodic structure having the period of the wavelength or less of the used light beam, or the period of a resonant range, that is, about the wavelength of the used light beam is formed on the diffractive surface, the diffractive surface shows deflection dependency. If the periodic structure is appropriately set, for example, a width W or a height H of the projections of the periodic structure formed in a rectangular wave form in section is appropriately set so that the deflection dependency can be reduced.

In the diffraction optical element according to an embodiment of the present invention, the one-dimensional periodical structure of the diffractive surface is a relief structure in which recesses and projections are arranged in a direction. Although various shapes, which are at least cross-sectional shapes satisfying the above conditions (1) and (2), are applied as the cross-sectional shape of the relief structure in the period-direction, a rectangular wave form is preferably applied because the periodic structure is easily formed.

The above periodic structure can be easily and appropriately formed by use of the microfabrication technology such as electronic beam lithography, photolithography, or the like. The one-dimensional periodic structure may be a structure having a periodically-varied refraction index.

The above transmissivities Tp(m), Ts(m) are obtained by a product of the transmissive diffraction efficiency and the Fresnel transmissivity, Therefore the shapes of the periodic structure, that is, the above width W and the height H are set so as to satisfy the equation (2), that is, the following equation to achieve the diffraction optical element which can be applied in any deflected state of the incident light beam without substantial deflection dependency.

According to the following examples, calculation results are concretely explained.

CALCULATION EXAMPLE 1

In the calculation example 1, the wavelength $\lambda$ of the used light beam is 0.655 μm. As the diffraction optical element, a substrate which has parallel flat surfaces and is made of material of refractive index N=1.46 is used and the diffractive surface has the one-dimensional periodic structure with the period $P=\lambda=0.655$ μm. The one-dimensional periodic structure is in the rectangular wave form in section as shown in FIG. 1A and is varied with the width W and the height H as parameters. The height H is defined as "$H=h\ \lambda$" where the wavelength of the used light beam is used as a unit and "h" is used as the parameter of the height H in the following equations.

The incident angle θ satisfying the Bragg condition is determined, that is, $\theta=\theta_0=30$ degrees and a calculation algorithm is the generally-used RCWA.

The results are graphically illustrated below with reference to the attached drawings. In the drawings, "TRANSMISSIVITY" in a vertical axis is transmissivity of the diffracted beam with the diffraction order m and "HEIGHT h" in a horizontal axis is the above parameter "h".

Figure 3:
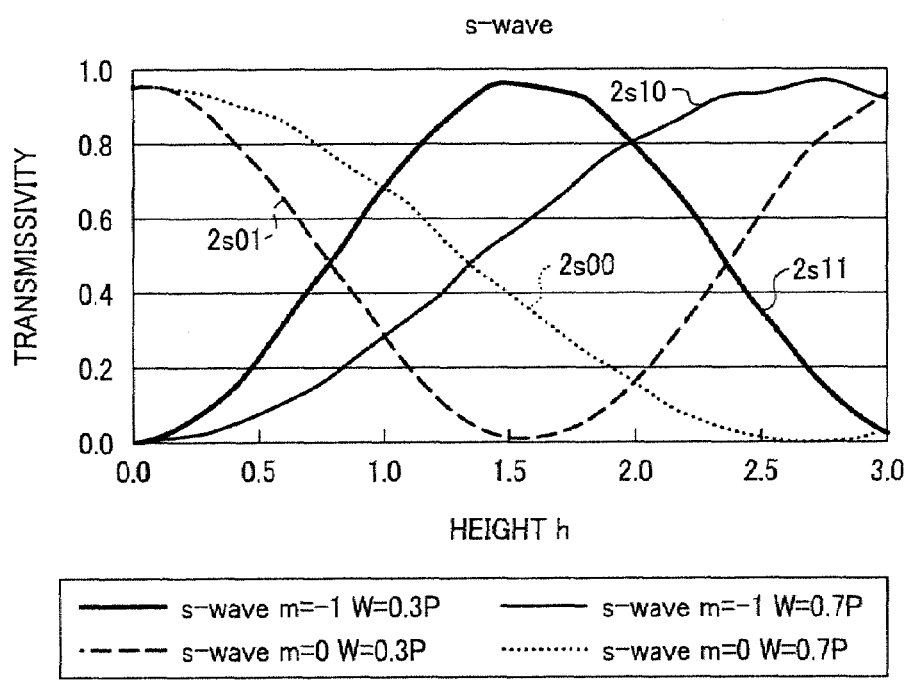
FIG. 3 is an explanatory view illustrating a calculation example 1 with respect to the diffraction optical element according to an embodiment of the present invention.

FIG. 2 shows the transmissivity Tp(m) with the diffraction orders m=−1, m=0 with respect to p-wave and FIG. 3 shows the transmissivity Ts(m) with the diffraction orders m=−1, m=0 with respect to s-wave.

Each of the transmissivities Tp(m), Ts(m) are obtained by the product of the transmissive diffraction efficiency on the diffractive surface and the Fresnel transmissivity on the exit-side flat surface opposite to the diffractive surface and, in the examples shown in FIGS. 2 and 3, the Fresnel transmissivity is 0.978 with respect to the p-wave and 0.949 with respect to the s-wave.

In FIG. 2, the result in the case of m=−1 and W=0.7 P is shown by a curve "2*m*10", the result in the case of m=0 and W=0.7 P is shown by a curve "2*m*00", the result in the case of m=−1 and W=0.3 P is shown by a curve "2*m*11", and the result in the case of m=0 and W=0.3 P is shown by a curve "2*m*01".

In FIG. 3, the result in the case of m=−1 and W=0.7 P is shown by a curve "2*s*10", the result in the case of m=0 and W=0.7 P is shown by a curve "2*s*00", the result in the case of m=−1 and W=0.3 P is shown by a curve "2*s*11", and the result in the case of m=0 and W=0.3 P is shown by a curve "2*s*01".

With reference to FIGS. 2 and 3, in the case of W=0.3 P (the curves 2*m*01, 2*m*11, 2*s*01, 2*s*11), the transmissivity has large deflection dependency in the case of the p-wave and s-wave with variation of the height h, that is, the transmissivities of the p-wave and s-wave largely differ from each other. On the other hand, in the case of W=0.7 P (the curves 2*m*00, 2*m*10, 2*s*00, 2*s*10), the transmissivity Tp(m) are similar to the transmissivity Ts(m) in both cases of the diffraction order m=0 and m=−1.

That is to say, in a case where the relief structure of the one-dimensional periodic structure in the rectangular wave form has projections with the width W of 0.7 P, the transmissivities Tp(m) and Ts(m) come close to each other over the wide range of the height h (0<h<3.0). Accordingly, the deflection dependency of the incident light beam can be reduced.

Figure 4:
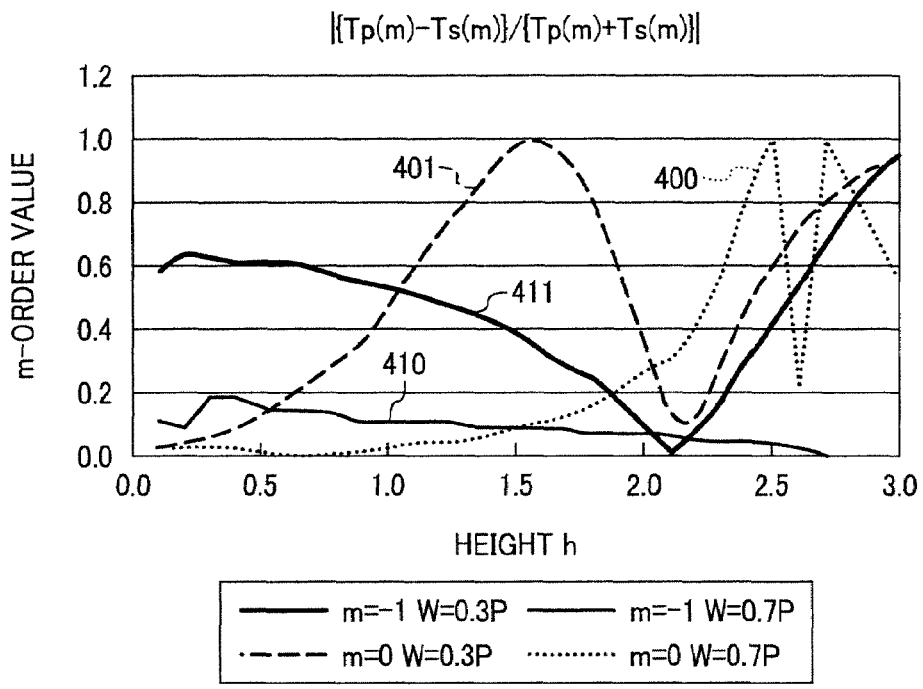
FIG. 4 is an explanatory view illustrating a calculation example 1 with respect to the diffraction optical element according to an embodiment of the present invention.
Figure 5:
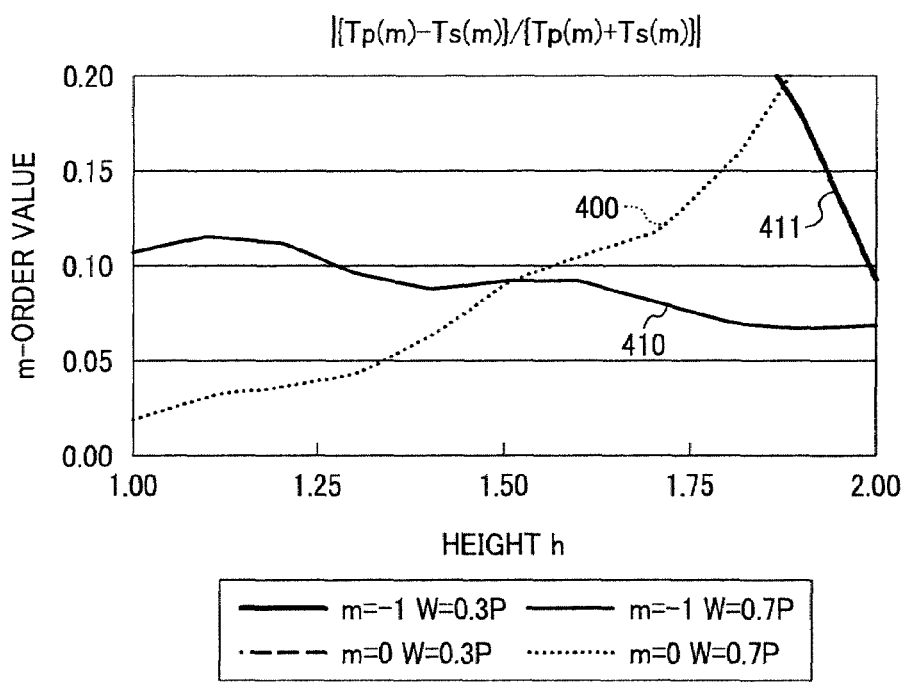
FIG. 5 is an explanatory view illustrating a calculation example 1 with respect to the diffraction optical element according to an embodiment of the present invention.

From the results shown in FIGS. 2 and 3, the parameter obtained by the above equation (2), that is, $|\{T'p(m)-T's(m)\}/\{T'p(m)+T's(m)\}|$ is graphically illustrated in FIG. 4. The larger the parameter is, the larger difference between the transmissivities of the p-wave and s-wave is. In FIGS. 4 and 5, the result in the case of m=0 and W=0.7 P is shown by a curve "400", the result in the case of m=−1 and W 0.7 P is shown by a curve "410", the result in the case of m=0 and W=0.3 P is shown by a curve "401", and the result in the case of m=−1 and W=0.3 P is shown by a curve "411".

In FIG. 5, an area of 1<h<2 in FIG. 4 is enlarged.

As shown in FIG. 5, in the case of the periodic structure where the width W=0.7 P and the height $H=h\lambda$ is in about a range of 1.25<h<1.6, with respect to the two beams (the curves 400, 410) diffracted And separated with the diffraction order m=−1 and m=0, the parameter of the above equation (2), that is, $|\{T'p(m)-T's(m)\}/\{T'p(m)+T's(m)\}|$ is 0.1 or less. Accordingly, the above diffraction optical element does not substantially show the deflection dependency so that the diffraction optical element can be applied to separate any deflected light beam in practical use.

As mentioned above, although the case where the light beam is diffracted only with m=0 and m=−1 is explained, the diffraction optical element can be applied to separate the light beam with the diffraction order other than m=0 and m=−1. However, in order to obtain the diffracted beam with the high transmissivity, power loss due to the diffracted beam with unnecessary diffraction order is preferably prevented and the separation number is preferably set to the minimum number which is required in the diffraction optical system. Accordingly, the used light beam LB is preferably separated into two diffracted beams by use of the diffraction orders of m=0 and −1, which occur when the light beam is incident with the incident angle θ≠0.

Figure 6:
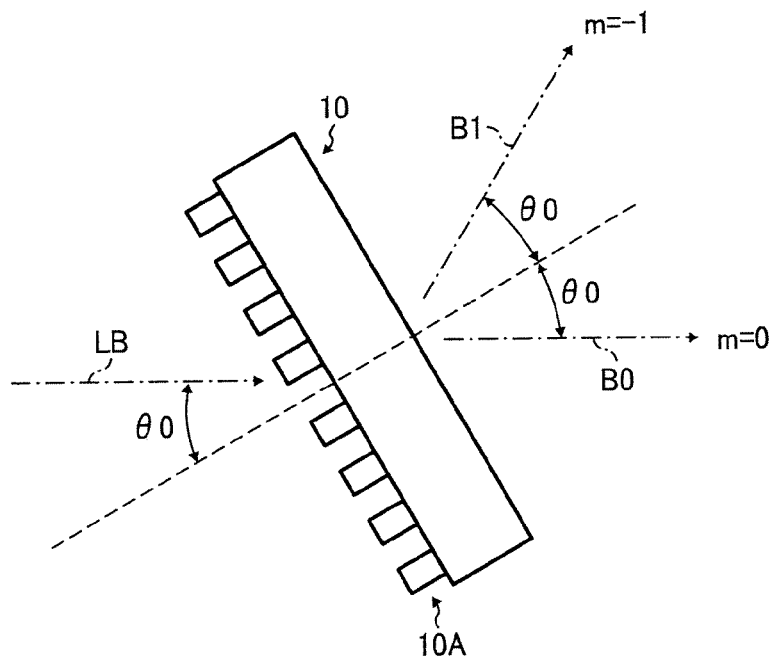
FIG. 6 is an explanatory view illustrating the diffraction optical element which separates an incident light beam into diffracted beams with a diffraction orders m=0 and m=−1.

In addition, as shown in FIG. 6, when the light beam LB is emitted into the diffractive surface 10A of the diffraction optical element 10 with the incident angle $\theta_0$ satisfying the Bragg condition, only two diffracted beams, that is, the beam B0 diffracted with the diffraction order m=0 and the beam B1 diffracted with the diffraction order m=−1 are formed and the separation angle between the diffracted beams B0, B1 is 2 $\theta_0$. Since the diffracted beams B0, B1 are symmetrically disposed in relation to a normal line of the exit surface of the diffraction optical element 10, a detector to detect the diffracted beam, or the other devices can be easily arranged.

In the diffractive optical element according to an embodiment of the present invention, the average transmissive diffraction efficiency T'(m) preferably satisfies the following condition:

$$|\{T'(0)-T'(-1)\}/\{T'(0)+T'(-1)\}|<0.1. \quad (4)$$

Due to the above condition (4), the light beam is separated into two beams (a beam with the diffraction order m=0 and a beam with the diffraction order m=−1), which have a substantially equal light intensity, regardless of the deflected state of the incident light beam.

The parameter of the above condition (4), that is $|\{T'(0)-T'(1)\}/\{T'(0)+T'(-1)\}|$ will be described below.

If the condition (4) is satisfied, there is substantially no difference between the transmissivities of the two separated beams, that is, the diffracted beam with the diffraction order of m=0 and the diffracted beam with the diffraction order m=−1. That is to say, the incident light beam can be separated into two beams which have substantially equal power in practical use, by use of the diffraction optical element satisfying the condition (4).

Figure 7:
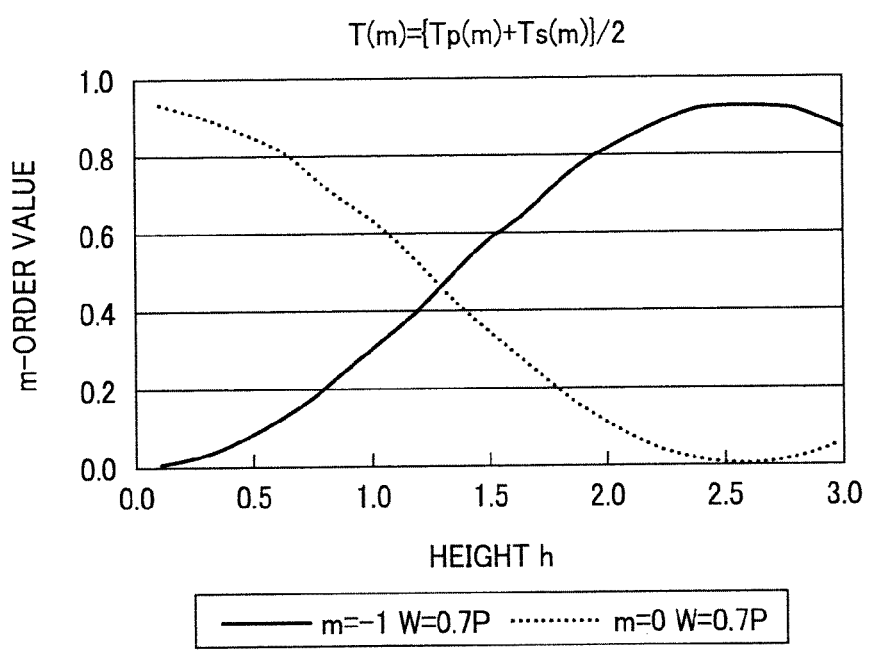
FIG. 7 is an explanatory view illustrating a calculation example 1 with respect to the diffraction optical element according to an embodiment of the present invention.

FIG. 7 shows the average transmissivity T(m) obtained with respect to the case of W=0.7 P. The solid line corresponds to the case of m=−1 and the dashed line corresponds to the case of m=0. The average transmissivity T(m) can be varied with the variation of the height $H=h\lambda$ of the relief structure. Accordingly, the shape of the periodic structure can be set so as to satisfy the condition (4) so that the two separated beams can have substantially equal power.

Figure 8:
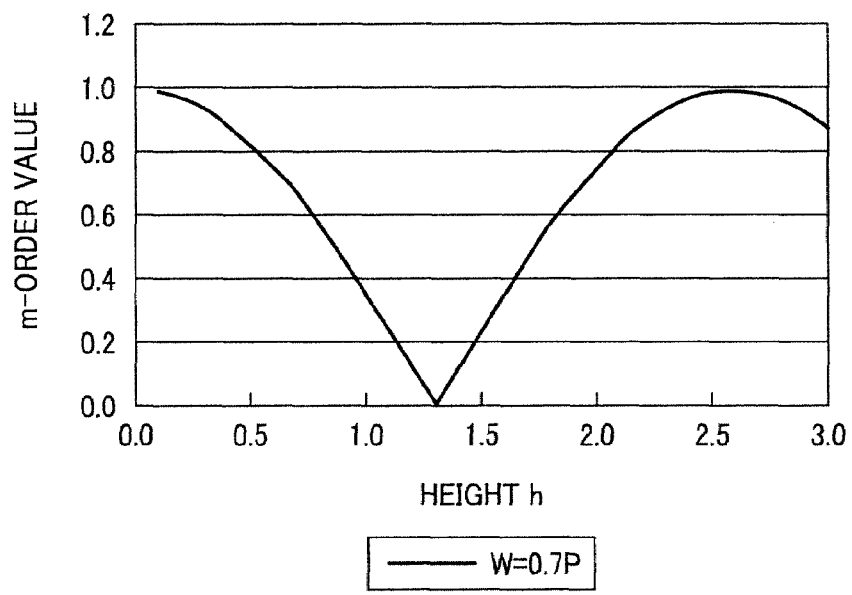
FIG. 8 is an explanatory view illustrating a calculation example 1 with respect to the diffraction optical element according to an embodiment of the present invention.

With reference to FIG. 7, the parameter $|\{T'(0)-T'(-1)\}/\{T'(0)+T'(-1)\}|$ in the case of W=0.7 P is obtained and shown in FIG. 8. In FIG. 8, when the value of the vertical axis becomes large, variation between the powers of the 0-order beam and the −1-order beam becomes large.

Figure 9:
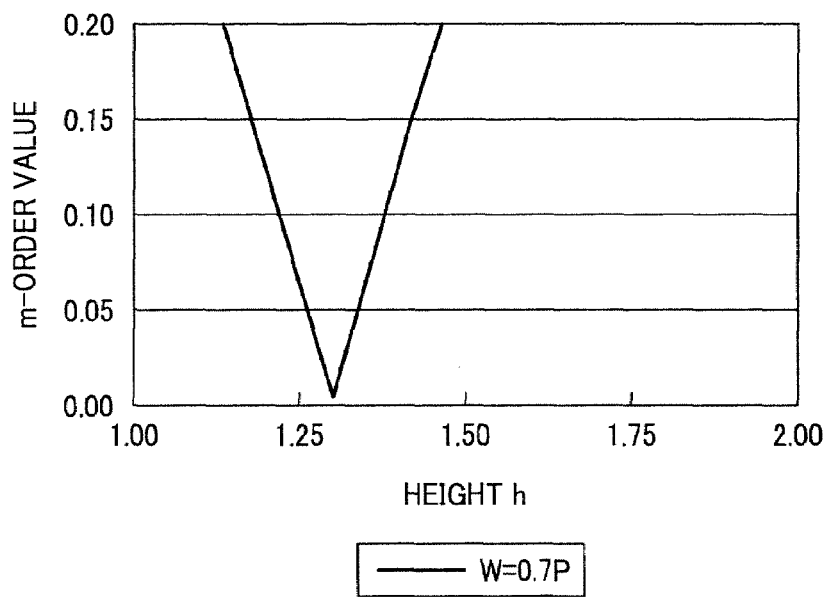
FIG. 9 is an explanatory view illustrating a calculation example 1 with respect to the diffraction optical element according to an embodiment of the present invention.

FIG. 9 shows an enlarged view illustrating an area of 1<h<2 in FIG. 8.

As clearly shown in FIG. 9, in the case where the width of the projections of the periodic structure is 0.7 P and the height H=hλ is in a range of about 1.22<h<1.38, the value of the parameter |{T'(0)−T'(−1)}/{T'(0)+T'(−1)}| with respect to the two separated beams with the diffraction orders m=−1 and m=0 can be controlled within 0.1 or less, so that the incident light beam can be separated into the two beams having substantially equal power. In particular, in the case of the periodic structure of about h=1.3, there is no deflection dependency and the two separated beams having equal power can be obtained.

CALCULATION EXAMPLE 2

FIGS. 10 to 13 show the calculation results in the case where the wavelength λ of the used light beam is 0.655 μm, as the diffraction optical element, a substrate which has parallel flat surfaces and is made of material of refractive index N=1.46 is used, the periodic structure of the rectangular-wave shape in section has the period P=λ=0.655 μm, and each of the projections of the periodic structure has the width W=0.4 P and W=0.6 P.

Figure 10:
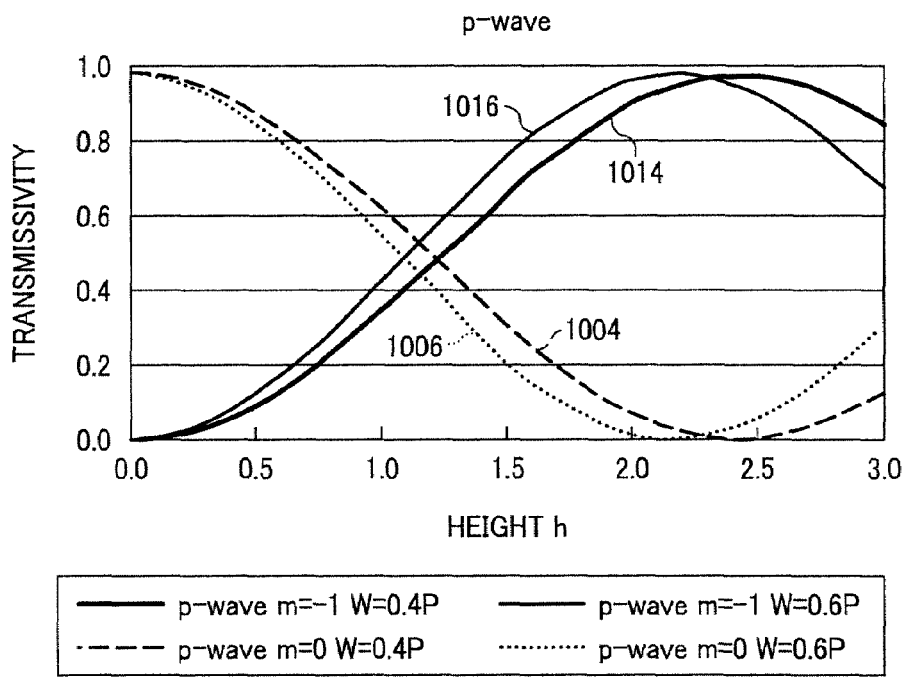
FIG. 10 is an explanatory view illustrating a calculation example 2 with respect to the diffraction optical element according to an embodiment of the present invention.

FIG. 10 shows a graph with respect to the transmissivity Tp(m), where the case of m=0 and W=0.4 P is shown by a curve "1004", the case of m=−1 and W=0.4 P is shown by a curve "1014", the case of m=0 and W=0.6 P is shown by a curve "1006", and the case of m=−1 and W=0.6 P is shown by a curve "1016".

Figure 11:
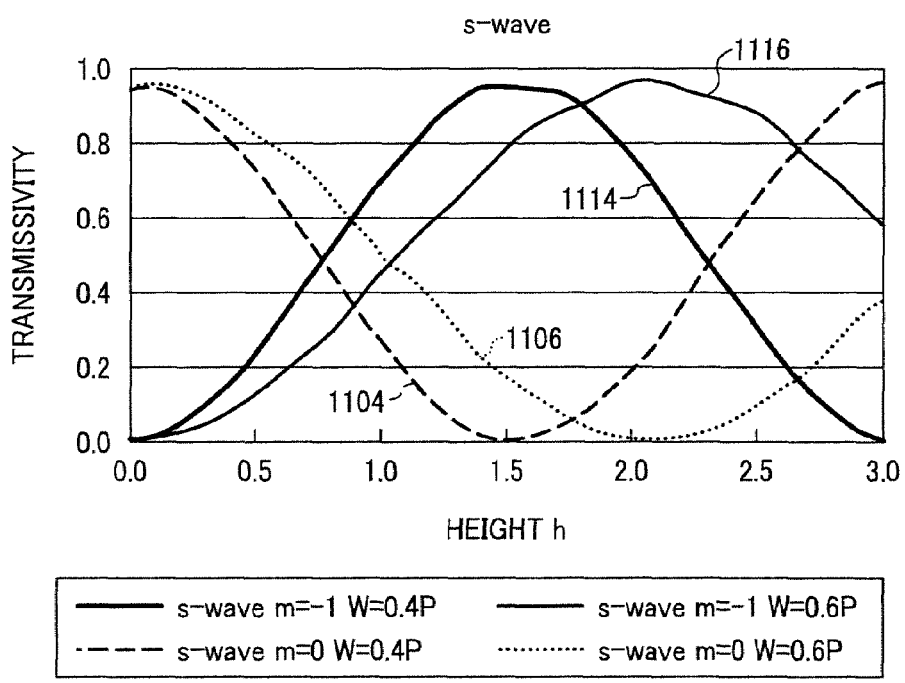
FIG. 11 is an explanatory view illustrating a calculation example 2 with respect to the diffraction optical element according to an embodiment of the present invention.

FIG. 11 shows a graph with respect to the transmissivity Ts(m), where the case of m=0 and W=0.4 P is shown by a curve "1104", the case of m=−1 and W=0.4 P is shown by a curve "1114", the case of m=0 and W=0.6 P is shown by a curve "1106", and the case of m=−1 and W=0.6 P is shown by a curve "1116".

Figure 12:
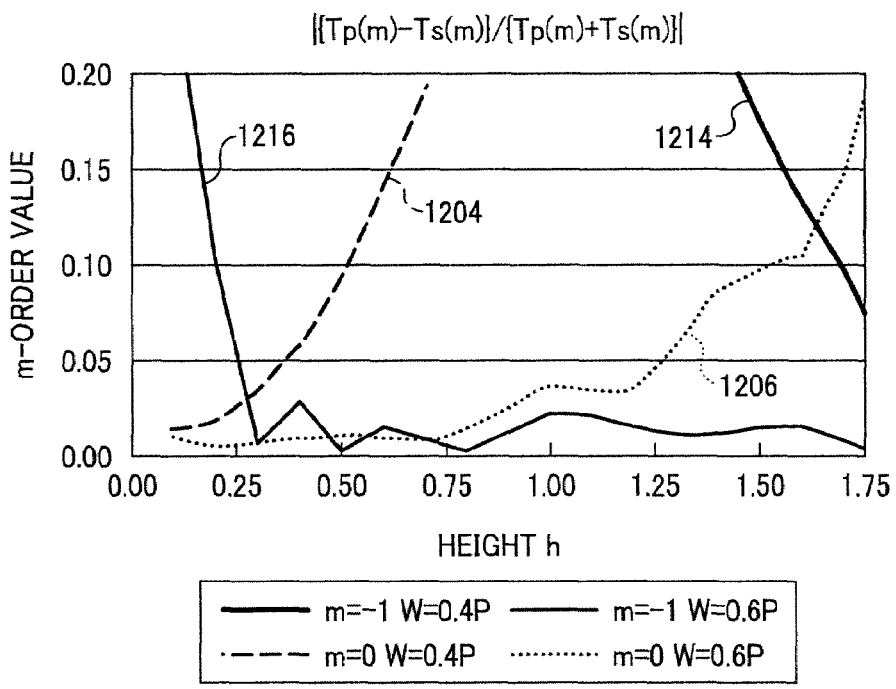
FIG. 12 is an explanatory view illustrating a calculation example 2 with respect to the diffraction optical element according to an embodiment of the present invention.

FIG. 12 shows a graph with respect to the parameter obtained by the above equation (2) in the range of 0<h<1.75, where the case of m=0 and W=0.4 P is shown by a curve "1204", the case of m=−1 and W=0.4 P is shown by a curve "1214", the case of m=0 and W=0.6 P is shown by a curve "1206", and the case of m=−1 and W=0.6 P is shown by a curve "1216".

Figure 13:
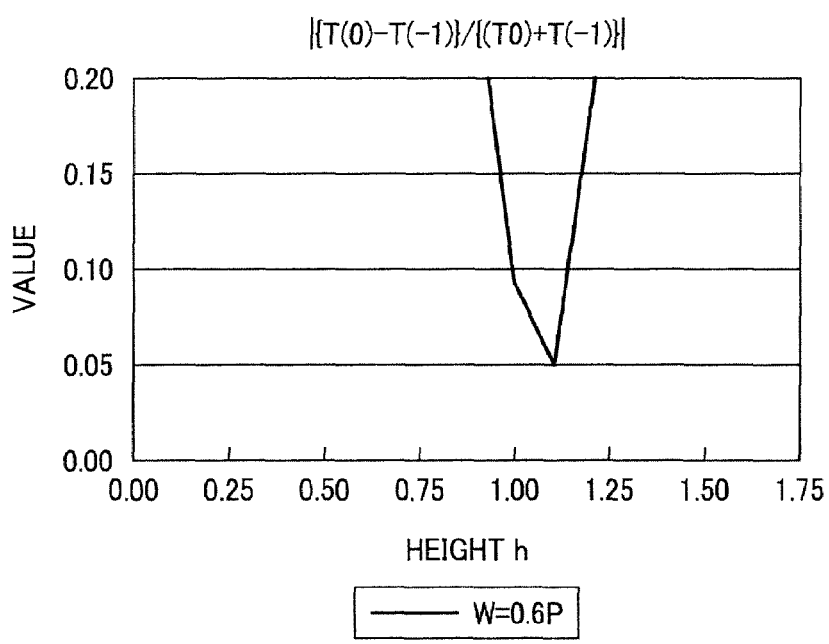
FIG. 13 is an explanatory view illustrating a calculation example 2 with respect to the diffraction optical element according to an embodiment of the present invention.

FIG. 13 shows a graph with respect to the parameter obtained by the condition (4) in an enlarged area of 0<h<1.75 with W=0.6 P.

As clearly shown in FIG. 12, in the case of the periodic structure where the width W is 0.6 P and the height H=hλ is in about a range of 0.25<h<1.25, with respect to the two beams diffracted with the diffraction orders m=−1 and m=0, the parameter of the above equation (2), that is, |{T'p(m)−T's(m)}/{T'p(m)+T's(m)}| is 0.1 or less. Accordingly, the above diffraction optical element satisfies the condition (2) and does not substantially show the deflection dependency so that the diffraction optical element can be applied to separate any deflected light beam in practical use.

Furthermore, as shown in FIG. 13, in the case of the diffraction optical element where the width W is 0.6 P, and the height h is in a range of about 1<h<1.15, with respect to the two beams diffracted with the diffraction orders m=−1 and m=0, the parameter of the condition (4), that is, |{T'(0)−T'(−1)}/{T'(0)+T'(−1)}| is 0.1 or less and therefore the condition (4) is satisfied. Accordingly, the two separated beams can have substantially equal power.

CALCULATION EXAMPLE 3

FIGS. 14 to 17 show the calculation results in the case where the wavelength λ of the used light beam is 0.655 μm, as the diffraction optical element, a substrate which is made of material of refractive index N=1.46 is used, the periodic structure of the rectangular-wave shape in section has the period P=0.6λ=0.393 μm, and the projections of the periodic structure have the width W=0.4 P and W=0.6 P, respectively.

Figure 14:
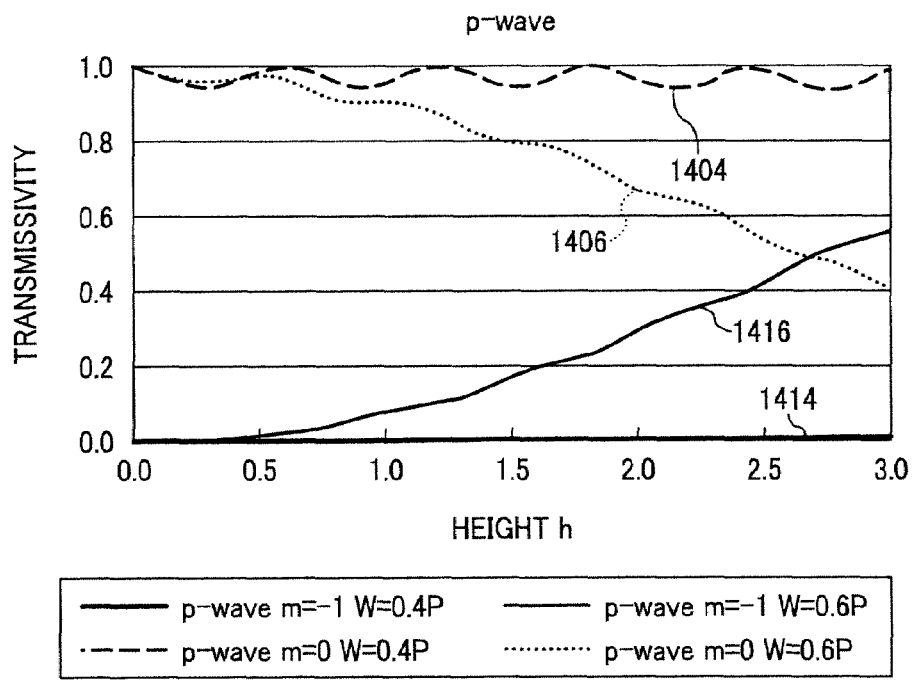
FIG. 14 is an explanatory view illustrating a calculation example 3 with respect to the diffraction optical element according to an embodiment of the present invention.

FIG. 14 shows a graph with respect to the transmissivity Tp(m), where the case of m=0 and W=0.4 P is shown by a curve "1404", the case of m=−1 and W=0.4 P is shown by a curve "1414", the case of m=0 and W=0.6 P is shown by a curve "1406", and the case of m=−1 and W=0.6 P is shown by a curve "1416".

Figure 15:
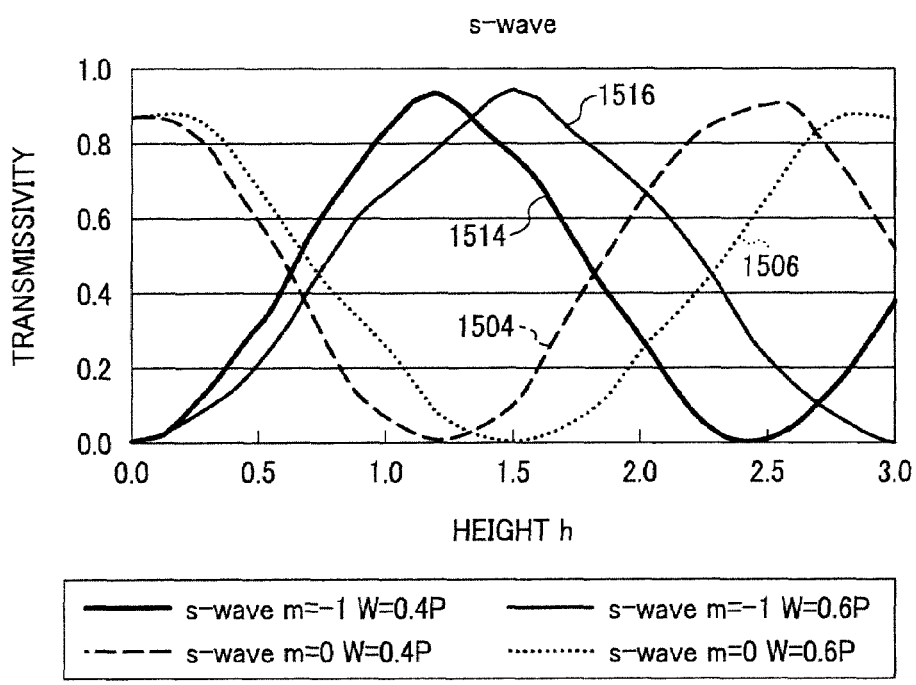
FIG. 15 is an explanatory view illustrating a calculation example 3 with respect to the diffraction optical element according to an embodiment of the present invention.

FIG. 15 shows a graph with respect to the transmissivity Ts(m), where the case of m=0 and W=0.4 P is shown by a curve "1504", the case of m=−1 and W=0.4 P is shown by a curve "1514", the case of m=0 and W=0.6 P is shown by a curve "1506", and the case of m=−1 and W=0.6 P is shown by a curve "1516".

Figure 16:
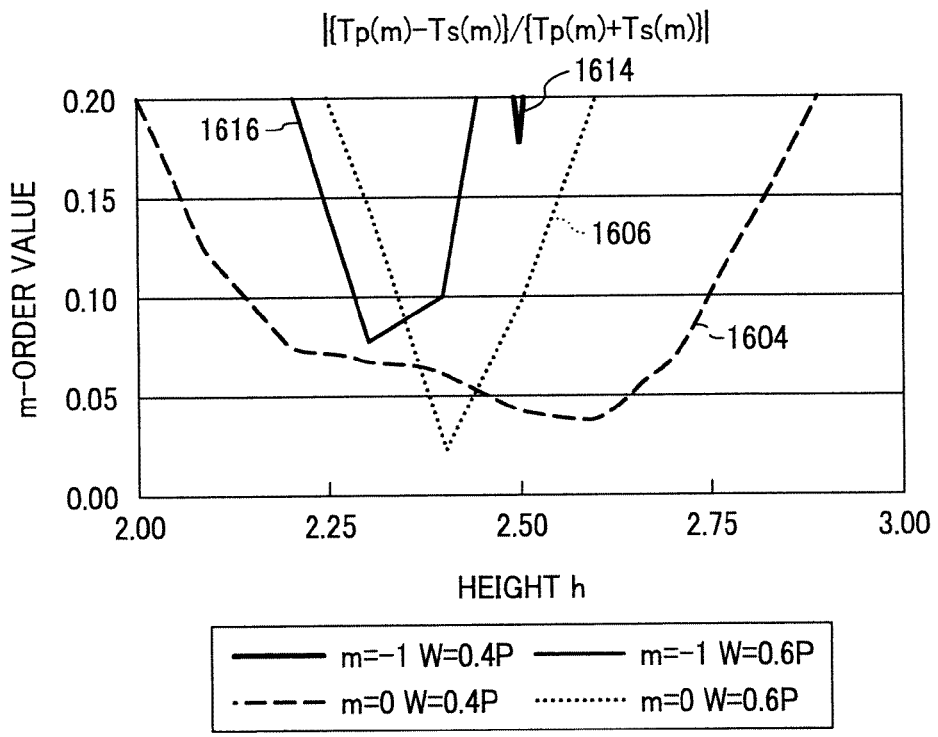
FIG. 16 is an explanatory view illustrating a calculation example 3 with respect to the diffraction optical element according to an embodiment of the present invention.

FIG. 16 shows a graph with respect to the parameter obtained by the above equation (2) in the range of 2<h<3, where the case of m=0 and W=0.4 P is shown by a curve "1604", the case of m=−1 and W=0.4 P is shown by a curve "1614", the case of m=0 and W=0.6 P is shown by a curve "1606", and the case of m=−1 and W=0.6 P is shown by a curve "1616".

Figure 18:
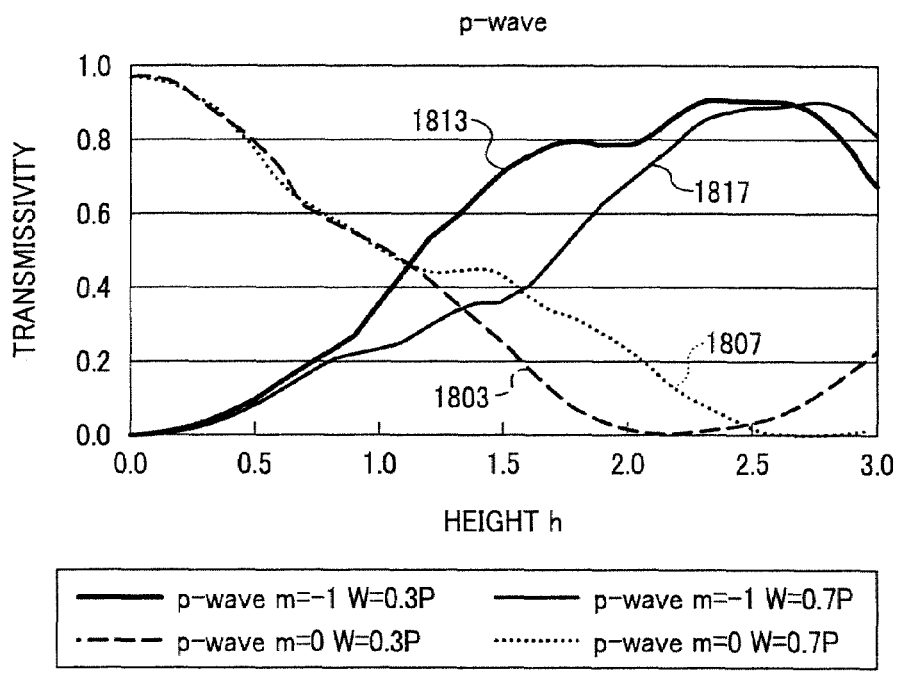
FIG. 18 is an explanatory view illustrating a calculation example 4 with respect to the diffraction optical element according to an embodiment of the present invention.

FIG. 18 shows a graph with respect to the parameter obtained by the condition (4) in an enlarged area of 2<h<3 with W=0.6 P.

As clearly shown in FIG. 16, in the case of the periodic structure where the width W is 0.6 P and the height H=hλ is in about a range of 2.23<h<2.4, with respect to the two beams diffracted with the diffraction orders m=−1 and m=0, the parameter of the above equation (2), that is, |{T'p(m)−T's(m)}/{T'p(m)+T's(m)}| is 0.1 or less. Accordingly, the above diffraction optical element satisfies the condition (2) and the diffraction optical element can be applied to separate any deflected light beam.

Figure 17:
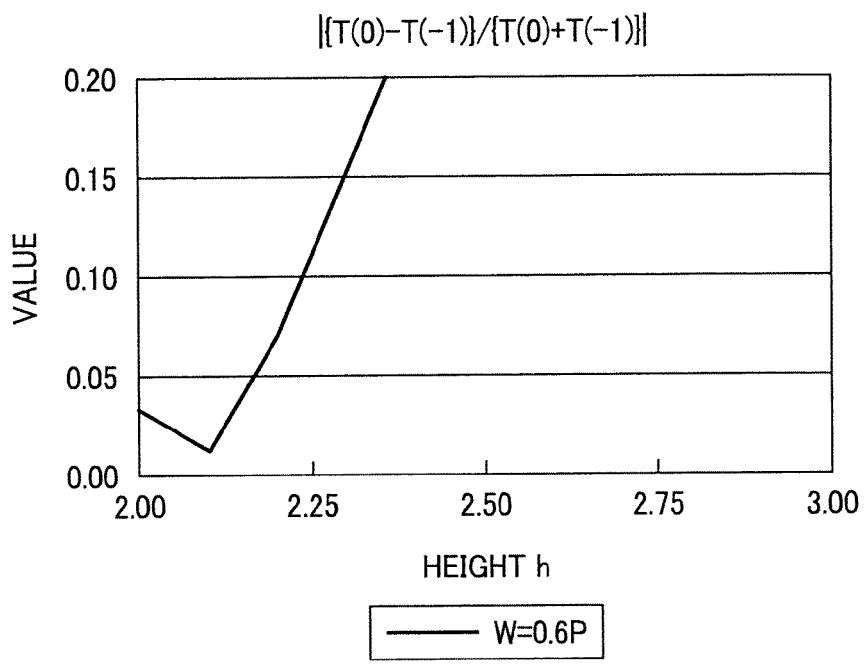
FIG. 17 is an explanatory view illustrating a calculation example 3 with respect to the diffraction optical element according to an embodiment of the present invention.

Furthermore, as shown in FIG. 17, in the case of the diffraction optical element where the height h is in a range of about 2.23<h<2.25, the parameter of the condition (4), that is, |{T'(0)−T'(−1)}/{T'(0)+T'(−1)}| is 0.1 or less and therefore the condition (4) is satisfied. Accordingly, the two separated beams can have substantially equal power.

However, if the height h deviates from the range of 2.23<h<2.25, the parameter or the condition (4) becomes larger than 0.1 and therefore the condition (4) is not satisfied. Accordingly, the two separated beams can not have substantially equal power.

CALCULATION EXAMPLE 4

FIGS. 18 to 21 show the calculation results in the case where the wavelength λ of the used light beam is 0.655 μm, as the diffraction optical element, a substrate which is made of material of refractive index N=1.46 is used, the periodic structure of the rectangular-wave shape in section has the period P=1.4 λ=0.917 μm, and each of the projections of the periodic structure has the width W=0.3 P and W=0.7 P.

FIG. 18 shows a graph with respect to the transmissivity Tp(m), where the case of m=0 and W=0.3 P is shown by a curve "1803", the case of m=−1 and W=0.3 P is shown by a curve "1813", the case of m=0 and W=0.7 P is shown by a curve "1807", and the case of m=−1 and W=0.6 P is shown by a curve "1817".

Figure 19:
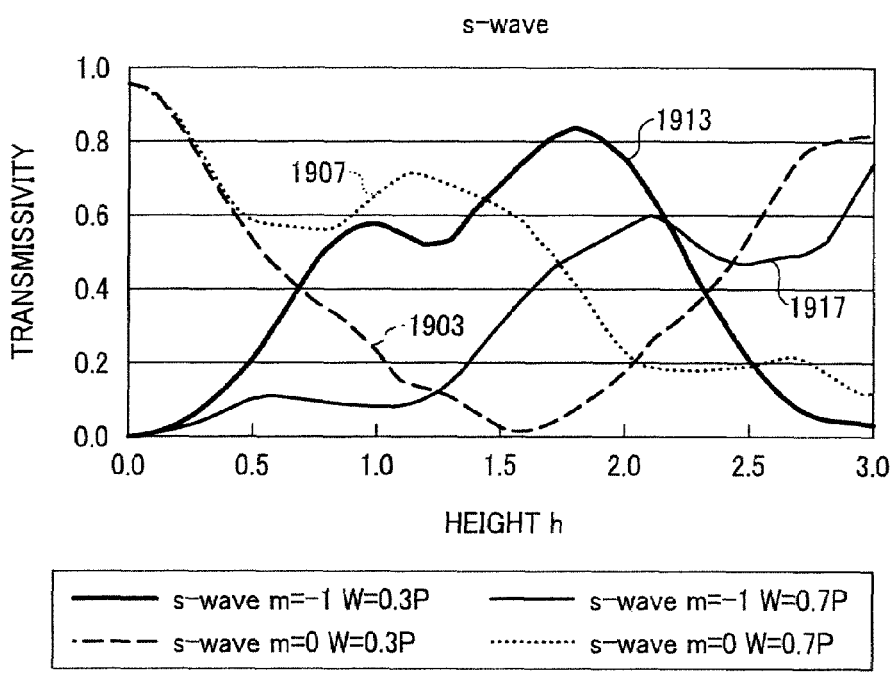
FIG. 19 is an explanatory view illustrating a calculation example 4 with respect to the diffraction optical element according to an embodiment of the present invention.

FIG. 19 shows a graph with respect to the transmissivity Ts(m), where the case of m=0 and W=0.3 P is shown by a curve "1903", the case of m=−1 and W=0.3 P is shown by a curve "1913", the case of m=0 and W=0.7 P is shown by a curve "1907", and the case of m=−1 and W=0.7 P is shown by a curve "1917".

Figure 20:
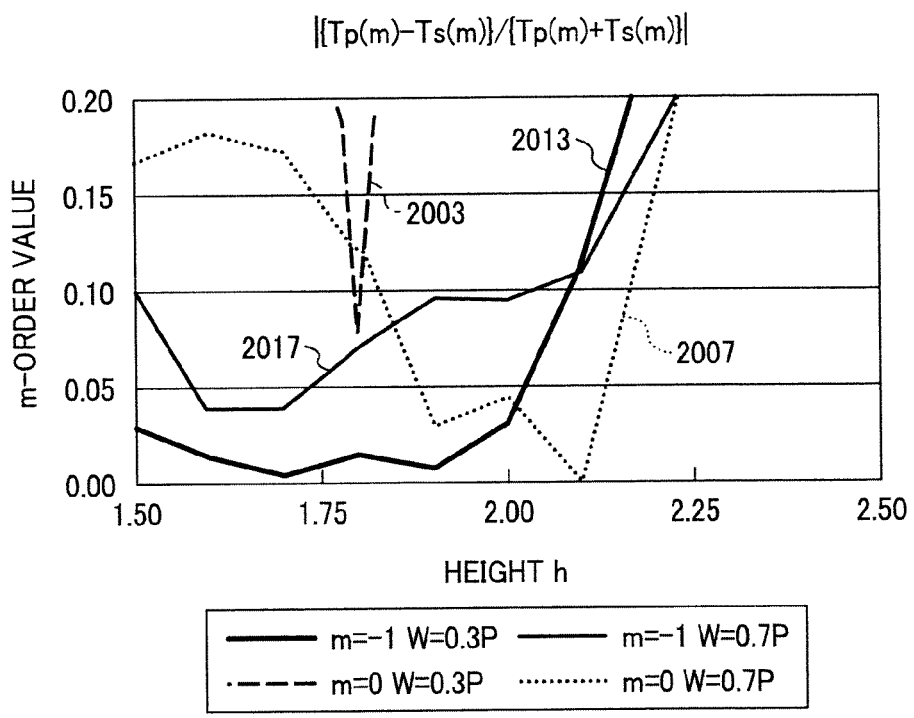
FIG. 20 is an explanatory view illustrating a calculation example 4 with respect to the diffraction optical element according to an embodiment of the present invention.

FIG. 20 shows a graph with respect to the parameter obtained by the above equation (2) in the range of 1.5<h<2.5, where the case of m=0 and W=0.3 P is shown by a curve "2003", the case of m=−1 and W=0.3 P is shown by a curve "2015", the case of m=0 and W=0.7 P is shown by a curve "2007", and the case of m=−1 and W=0.7 P is shown by a curve "2017".

Figure 21:
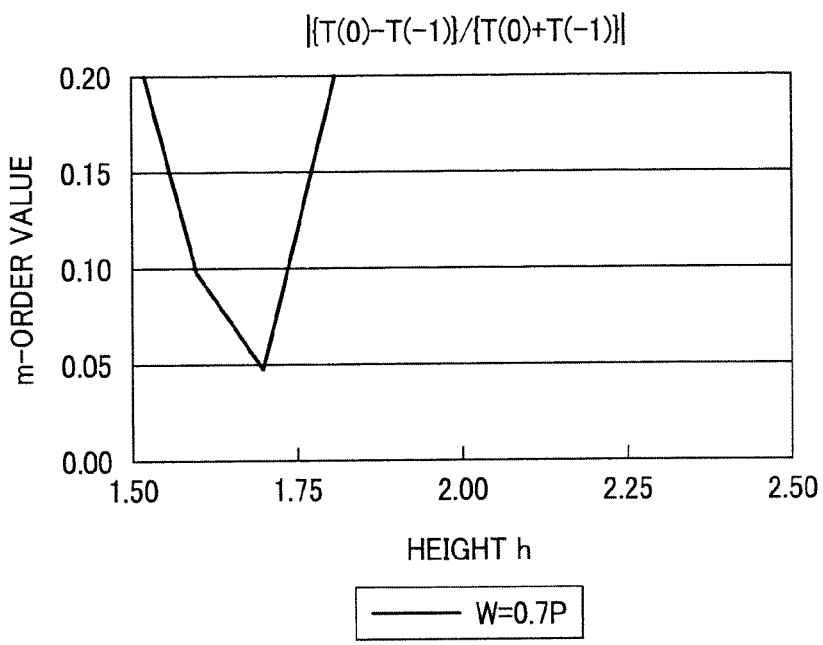
FIG. 21 is an explanatory view illustrating a calculation example 4 with respect to the diffraction optical element according to an embodiment of the present invention.

FIG. 21 shows a graph with respect to the parameter of the condition (4) in an area of 1.5<h<2.5 with W=0.7 P.

As clearly shown in FIG. 20, in the case of the periodic structure where the width W=0.7 P and the height H=hλ is in about a range of 1.82<h<2.03, with respect to the two beams diffracted with the diffraction orders m=−1 and m=0, the parameter of the above equation (2), that is, |{T'p(m)−T's(m)}/{T'p(m)+T's(m)}| is 0.1 or less. Accordingly, the above diffraction optical element satisfies the condition (2) and the diffraction optical element can be applied to separate any deflected light beam.

In the case of W=0.3 P, it is found that only when the height is set to the height H≈1.80λ, the condition (2) is satisfied and the diffraction optical element can be applied to separate any deflected light beam.

As shown in FIG. 21, in the case of the diffraction optical element where the height h is in a range of about 1.82<h<2.03 with the width W=0.7 P, the parameter of the condition (4) is more than 0.1 and therefore the condition (4) is satisfied. Accordingly, the two separated beams can not have substantially equal power. That is to say, the conditions (2) and (4) are incompatible.

CALCULATION EXAMPLE 5

Figure 22:
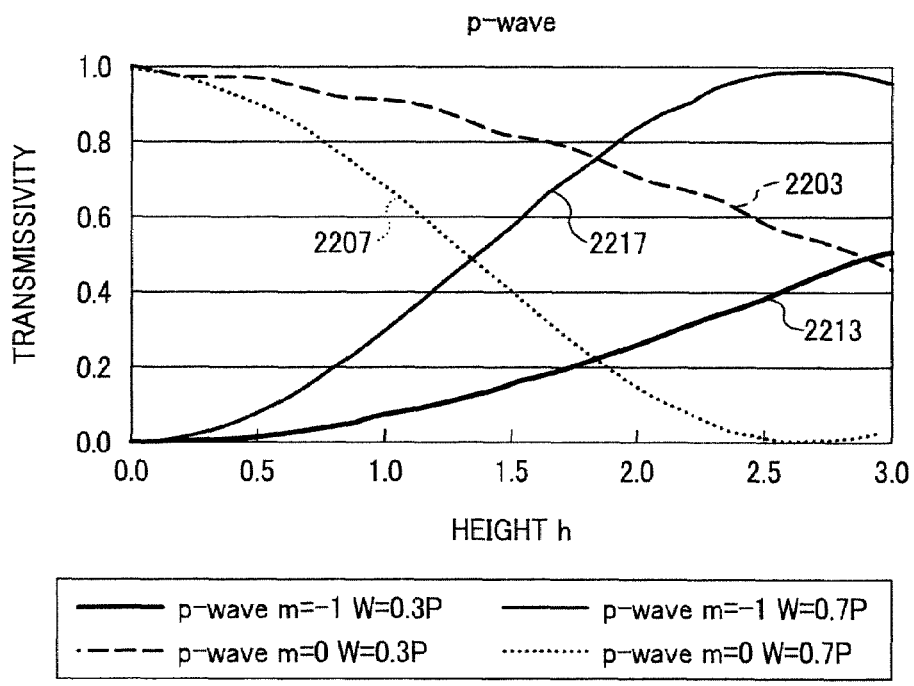
FIG. 22 is an explanatory view illustrating a calculation example 5 with respect to the diffraction optical element according to an embodiment of the present invention.
Figure 23:
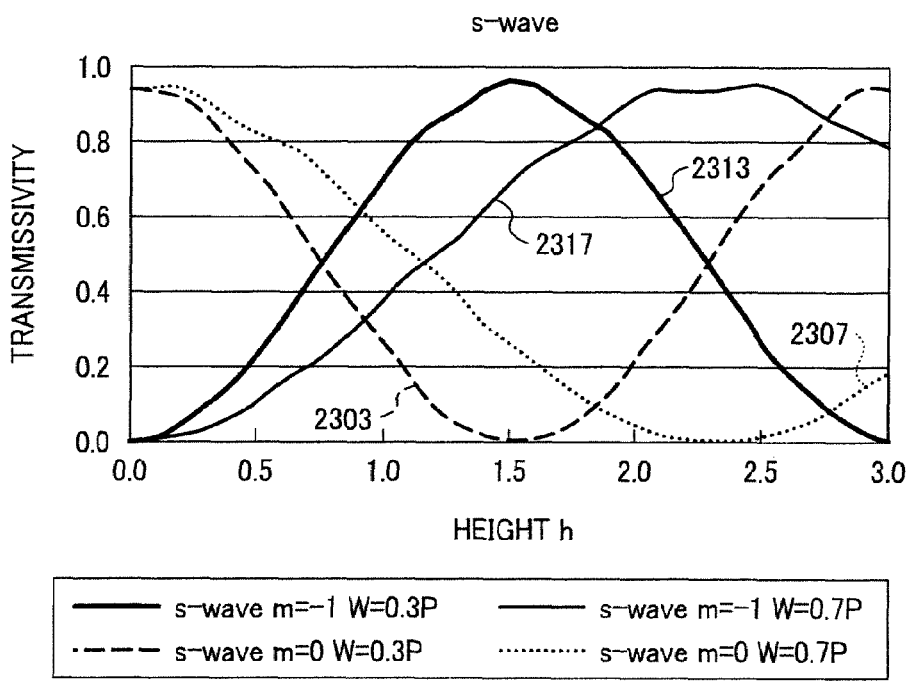
FIG. 23 is an explanatory view illustrating a calculation example 5 with respect to the diffraction optical element according to an embodiment of the present invention.
Figure 24:
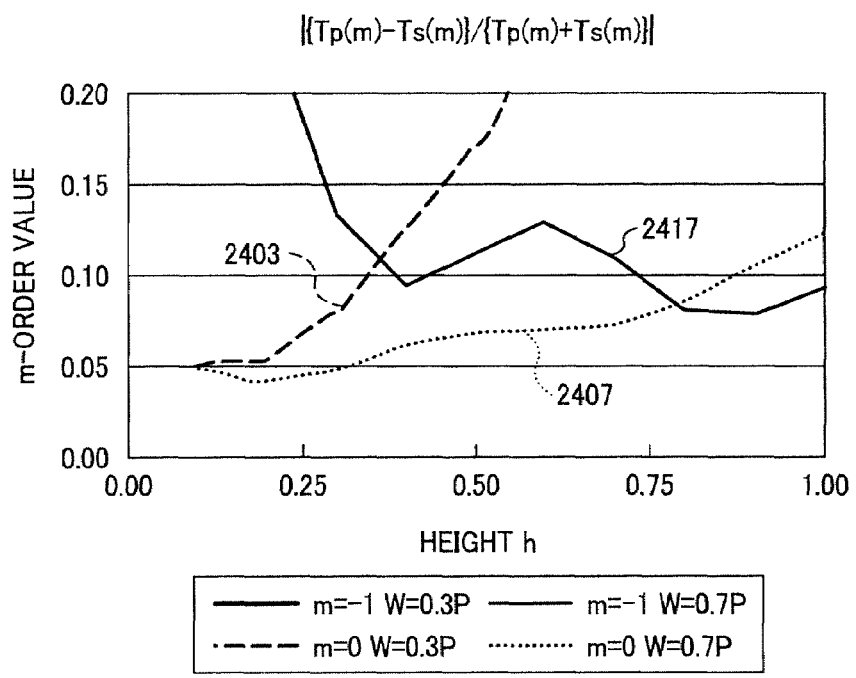
FIG. 24 is an explanatory view illustrating a calculation example 5 with respect to the diffraction optical element according to an embodiment of the present invention.

FIGS. 22 to 24 show the calculation results in the case where the wavelength λ of the used light beam is 0.655 μm, as the diffraction optical element, a substrate which is made of material of refractive index N=1.46 is used, the periodic structure of the rectangular-wave shape in section has the period P=0.8λ=0.524 μm, and each of the projections of the periodic structure has the width W=0.3 P and W=0.7 P.

FIG. 22 shows a graph with respect to the transmissivity Tp(m), where the case of m=0 and W=0.3 P is shown by a curve "2203", the case of m=−1 and W=0.3 P is shown by a curve "2213", the case of m=0 and W=0.7 P is shown by a curve "2207", and the case of m=−1 and W 0.7 P is shown by a curve "2217".

FIG. 23 shows a graph with respect to the transmissivity Ts(m), where the case of m=0 and W=0.3 P is shown by a curve "2303", the case of m=−1 and W=0.3 P is shown by a curve "2313", the case of m=0 and W=0.7 P is shown by a curve "2307", and the case of m=−1 and W=0.7 P is shown by a curve "2317".

FIG. 24 shows a graph with respect to the parameter obtained by the above equation (2) in the range of 0<h<1, where the case of m=0, W=0.3 P is shown by a curve "2403", the case of m=0 and W=0.7 P is shown by a curve "2407", and the case of m=−1 and W=0.7 P is shown by a curve "2417".

As shown in FIG. 24, in the case of the periodic structure where the width W=0.7 P and the height H=hλ is in about a range of 0.38<h<0.43, and 0.74<h<0.87, with respect to the two beams diffracted with the diffraction order m=−1 and m=0, the parameter of the above equation (2), that is, |{T'p(m)−T's(m)}/{T'p(m)+T's(m)}| is 0.1 or less. Accordingly, the above diffraction optical element can be applied to separate any deflected light beam. On the other hand, in the case of W=0.3 P, there is no range of h satisfying the condition (2).

In the above embodiments or examples, the periodic structure of the diffractive surface is the rectangular-wave shape in section, but the one-dimensional periodic structure is not limited thereto. For example, as shown in FIG. 13, the diffractive surface 10B of the diffraction optical element 10 may have a structure where the refractive index of the medium is repeatedly periodically varied with the period P in upward and downward directions of FIG. 1B. In this case, the diffraction angle can be controlled with the period P as well as in the case of the diffraction optical element shown in FIG. 1A. By appropriately setting the shape of the periodic structure, the diffraction optical element which is applied for any deflected light beam can be achieved.

Figure 26:
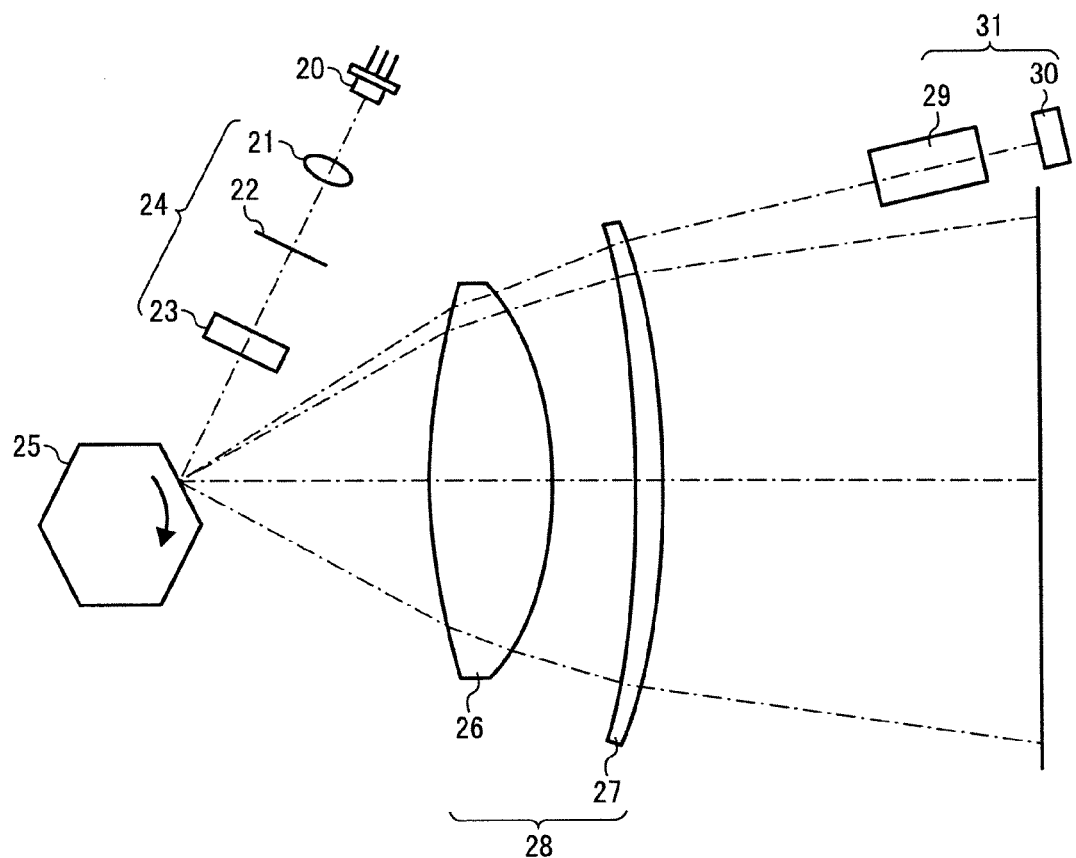
FIG. 26 is an explanatory view illustrating an example of an optical layout of an optical scanner according to an embodiment of the present invention.
Figure 27:
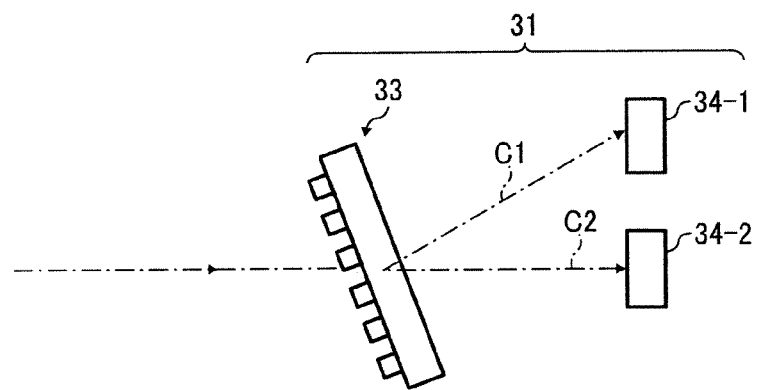
FIG. 27 is an explanatory view illustrating a light beam detection by a light beam detection device shown in FIG. 27.
Figure 28:
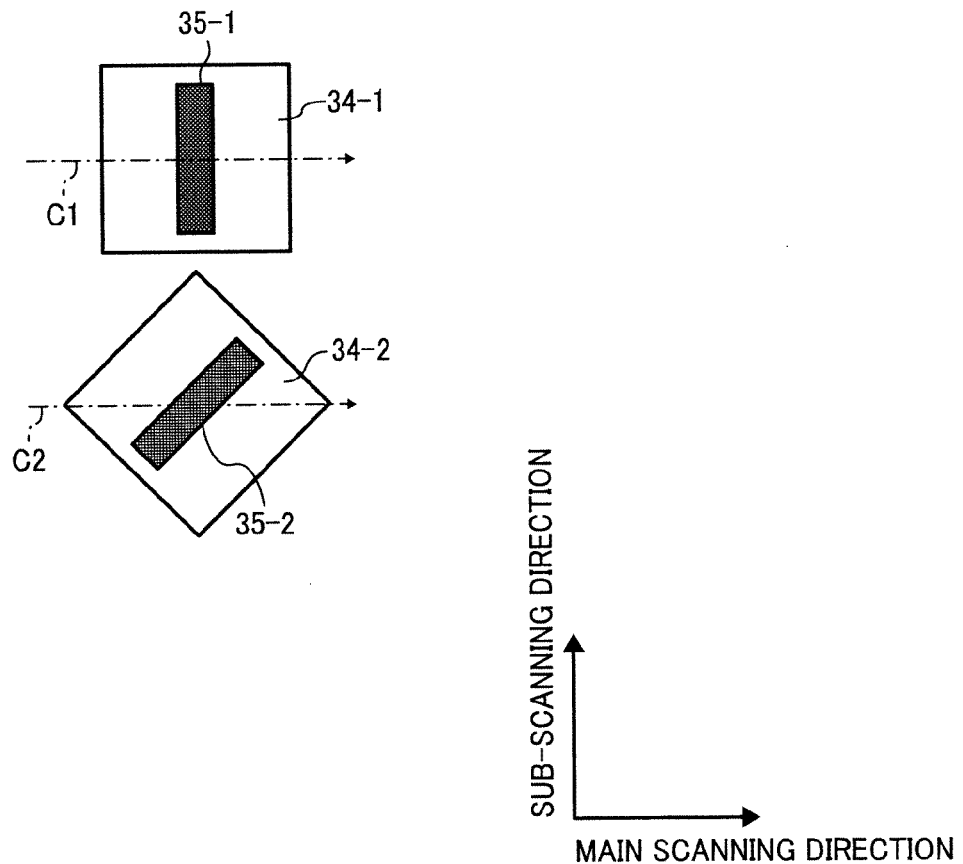
FIG. 28 is an explanatory view illustrating a light beam detection by a light beam detection device shown in FIG. 27.

As shown in FIGS. 26 to 28, the diffraction optical element 33 according to an embodiment of the present invention can be used in a light beam detection device 31 to detect a light beam. The light beam detection device 31 includes the above diffraction optical element 33, which is configured to diffract the light beam to separate the light beam into a plurality of diffracted beams in a predetermined direction such as a sub scanning direction and a light detector 30 configured to have a plurality of light-receiving portions 35-1, 35-2 which are disposed in the predetermined direction and detect respectively the plurality of diffracted beams. The light beam detection device 31 may be used in an optical scanner in which the light beam is deflected in a main scanning direction to scan a surface to be scanned to detect the light beam.

The diffraction optical element 33 is provided on a light path of the deflected light beam and diffracts the light beam to separate the light beam into the plurality of diffracted beams in the sub scanning direction which is perpendicular to the main scanning direction. The plurality of light-receiving portions 35-1, 35-2 may be disposed in the sub scanning direction.

That is, each beam separated by the diffraction optical element enters each light-receiving portion 35-1, 35-2 and is detected thereby. The diffraction optical element 33 separates the light beam in the sub scanning direction with a large separation angle so that the light-receiving portions 35-1, 35-2 of the light detector 30 can be disposed with a large interval to each other and near the diffraction optical element 33. This causes small size light detector.

Figure 25:
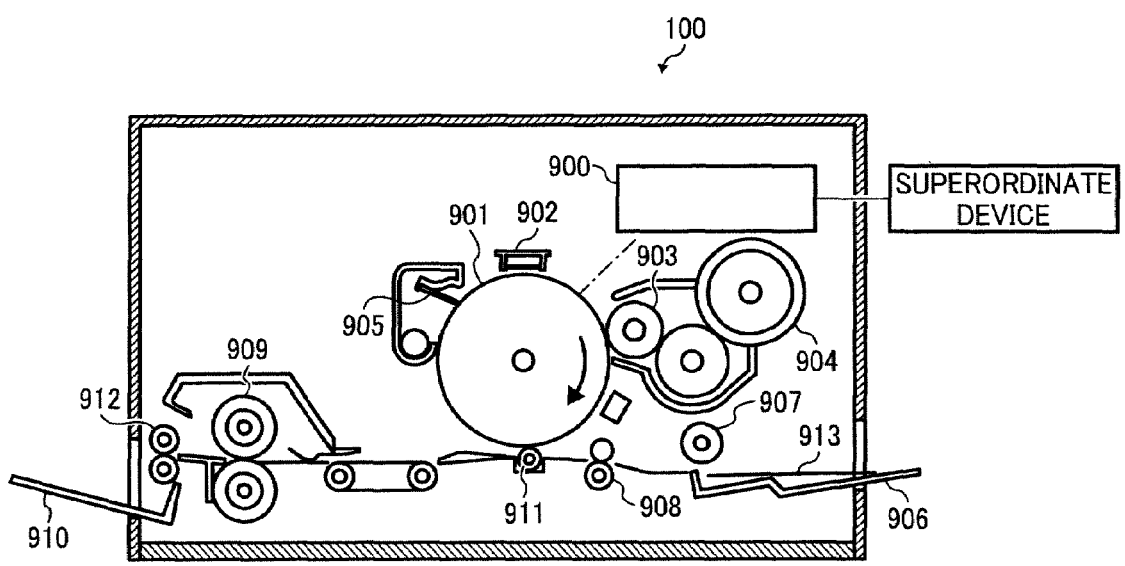
FIG. 25 is an explanatory view illustrating an image forming apparatus according to an embodiment of the present invention.

As shown in FIG. 25, an optical scanner 900 using the light beam detection device provided with a diffraction optical element according to an embodiment of the present invention is used in an image forming apparatus which forms an image as described below.

FIG. 25 shows a schematic configuration of a laser printer as an image forming apparatus according to an embodiment of the present invention.

The laser printer 100 includes the optical scanner 900, a photoconductive drum 901 as a surface to be scanned, an electrostatic charger 902, a development roller 903, a toner cartridge 904, a cleaning blade 905, a paper feed tray 906, a paper feed roller 907, a pair of resist rollers 908, a transfer charger 911, fixing rollers 909, paper discharge rollers 912, and a paper receiving tray 910.

The electrostatic charger 902, the development roller 903, the transfer charger 911, and the cleaning blade 905 are disposed so as to surround the photoconductive drum 901 in a rotational direction of the photoconductive drum 901, for example, in a clockwise direction of FIG. 25.

The photoconductive drum 901 is provided with a photoconductive photosensitive layer on a peripheral surface thereof. The photoconductive drum 901 is rotated in the clockwise direction of FIG. 25, that is, in a direction shown by an arrow.

The electrostatic charger 902 electrostatically uniformly charges the surface of the photoconductive drum 901.

The optical scanner 900 scans the uniformly electrostatically charged surface of the photoconductive drum 901 with a light beam modified based on image information supplied from a superordinate device such as a personal computer to perform an optical writing.

In the optical writing, a longitudinal direction of the photoconductive drum 901, that is, a direction along a rotational axis thereof is referred to as a main scanning direction, and the rotational direction of the photoconductive drum 901 is referred to as a sub-scanning direction. Of a scanning area between a scanning start position and a scanning end position on the photoconductive drum 901 in the main scanning direction, an area where a latent image is formed is referred to as an effective image forming area.

By scanning with the light beam, an electrical charge is removed on an area of the surface of the photoconductive drum 901, which is scanned with the light beam and the latent image corresponding to the image information is formed on the photoconductive drum 901. The formed latent image is moved to a position facing the development roller 903 with rotation of the photoconductive drum 901.

Toner is stored in the toner cartridge 904 and supplied to the development roller 903, Toner amount in the toner cartridge 904 is checked when the laser printer is powered on or printing is finished, and a message to encourage user to exchange the toner cartridge is displayed on a display unit (not shown) when the residual amount is not enough.

By the development roller 903, the toner supplied from the toner cartridge 904 with the rotation of the photoconductive drum 901 is electrostatically charged and thinly uniformly attached. In addition, a bias voltage is applied on the development roller 903 such that the charged area of the photoconductive drum 901, that is, the area where the light beam is not emitted has an opposite electrical field in relation to that of the non-charged area where the light beam is emitted. Due to the bias voltage, the toner held on the surface of the development roller 903 is attached to the exposed area of the surface of the photoconductive drum 901. That is, by the development roller 903, the toner is attached to the latent image formed on the surface of the photoconductive drum 901 to visualize the image information as a toner image. The toner image is moved toward a side of the transfer charger 911 with the rotation of the photoconductive drum 901.

Recording papers 913 as a recording medium on which the toner image is transferred are stored in the paper feed tray 906, and fed from the paper feed tray 906 to the pair of resist rollers 908 by one by via the paper feed roller 907. The pair of resist rollers 908 are disposed near the transfer roller 911, temporarily holds the recording paper 913 fed by the paper feed roller 907 and send the recording paper 913 to an interval between the photoconductive drum 901 and the transfer charger 911 with the rotation of the photoconductive drum 901.

A transfer voltage of antipolarity to the toner is applied to the transfer charger 911 to electrically attract the toner image formed on the photoconductive drum 901 to the recording paper 913 so that the toner image formed on the photoconductive drum 901 is transferred to the recording paper 913. The toner image is fixed on the recording paper 913 by heating and pressing the recording paper 913 on which the toner image is transferred through the fixing rollers 909. The recording paper on which the toner image is fixed is sent to the paper receiving tray 910 via the paper discharge rollers 912 and is sequentially stacked on the paper receiving tray 910.

The cleaning blade 905 removes the residual toner remaining on the surface of the photoconductive drum 901 and the residual toner is reused. The surface of the photoconductive drum 901 from which the residual toner is removed is returned to a position of the electrostatic charger 902.

As described above, FIG. 26 is an explanatory view illustrating an optical layout of the optical scanner shown by the reference number 900 in FIG. 25. The optical scanner includes a light source unit 20, a light shaping optical system 24, a light deflection unit 25, a scanning-imaging optical system 28, and the above light beam detection device 31.

The light shaping optical system 24 includes a coupling lens 21, an aperture 22, and a cylindrical lens 23. The scanning-imaging optical system 28 includes two scanning-imaging lenses 26, 27. The light beam detection device 31 includes a separation optical system 29 and a light detector 30. A not-shown processing device and the like are provided.

As the light source unit 20, a semiconductor laser as a single beam light source can be used. A semiconductor laser array on which a plurality of semiconductors are mounted adjacent to each other, as a multi-beam light source, and a surface emitting laser array such as a VCSEL array also can be used.

The coupling lens 21 has a function of shaping light emitted from the light source unit 20 into a substantially parallel light flux. The coupling lens 21 may have a function of shaping the light emitted from the light source unit 20 into a weak-convergent light flux or a weak-divergent light flux. The light beam from the coupling lens 21 is partly shaded and converged in the sub scanning direction by the cylindrical lens 23 so that a line image extending in the main scanning direction in the vicinity of a deflection-reflection surface of the light deflection unit 25 is imaged.

When the light deflection unit 25 is rotated and driven in a arrow direction of FIG. 26, the light beam is deflected and a light spot is formed on the surface to be scanned by the two scanning-imaging lenses 26, 27.

Through the scanning-imaging optical system 28, the light beam directed to an outside of the effective image forming area at the scanning start side in the main scanning direction is emitted into the light beam detection device 31 and a position of the light beam in the sub scanning direction. The light beam detection device 31 also detects the position of the light beam in the main scanning direction and performs a so-called synchronization detection to adjust a timing to the scanning start position in the main scanning direction.

As not shown in FIG. 26, a reflection mirror is disposed on the light path to lead the light beam to a predetermined position of the photoconductive drum. The reflection mirror may be disposed in one of various positions, and the reflection mirror may be disposed between the light deflection unit and the scanning-imaging lens, between the two scanning-imaging lenses, or between the scanning-imaging lens and the photoconductive drum and generally disposed after the light deflection unit. Accordingly, the light beam is reflected by the reflection mirror and then a deflected state of the light beam is changed so that the deflected state of the light beam when the light beam is emitted into the light beam detection device 31 is a generally elliptically deflected state.

The separation optical system 29 of the light beam detection device 31 separates the incident light beam into two beams. As the separation optical system 29, the above-described diffraction optical element 33 is used.

FIG. 27 is an explanatory view illustrating a configuration of the light beam detection device 31. The light beam directed to the light beam detection device 31 disposed outside of the effective image forming area via the scanning-imaging optical system 28 is emitted into the diffraction optical element 33 and separated into the two beams C1, C2 in the sub scanning direction, that is, upward and downward directions in FIG. 27. The separated beams C1, C2 are detected by detecting portions 34-1, 34-2 of the light detector 30, where the light receiving portions 35-1, 35-2 are disposed in the sub scanning direction, respectively. In FIG. 27, the direction perpendicular to the drawing, that is the direction perpendicular to each of the directions C1 and C2 is the main scanning direction.

FIG. 28 is a view illustrating a configuration and a layout of the detecting portions 34-1, 34-2 of the light detector 30 shown in FIG. 26. The detecting portions 34-1, 34-2 are disposed in the sub scanning direction, that is, upward and downward directions of FIG. 28 and each include the light receiving portions 35-1, 35-2 each of which receives a light beam and performs a photoelectric conversion. The two detecting portions 34-1, 34-2 of the light detector 30 have the same shape and the same structure, the light receiving portions 35-1, 35-2 are in a rectangular form, the light receiving portion 35-1 of the light detector 34-1 has a longitudinal direction parallel to the sub scanning direction, and the light receiving portion 35-2 of the detecting portion 34-2 has a longitudinal direction inclining with an angle in relation to the sub scanning direction.

The deflected light beam is separated into the two beams C1, C2 in the sub scanning direction by the diffraction optical element 33 and the light receiving portions 35-1, 35-2 are scanned with the separated beams in the direction shown by the arrow of FIG. 28 and the separated beams are detected thereby respectively.

Figure 29:
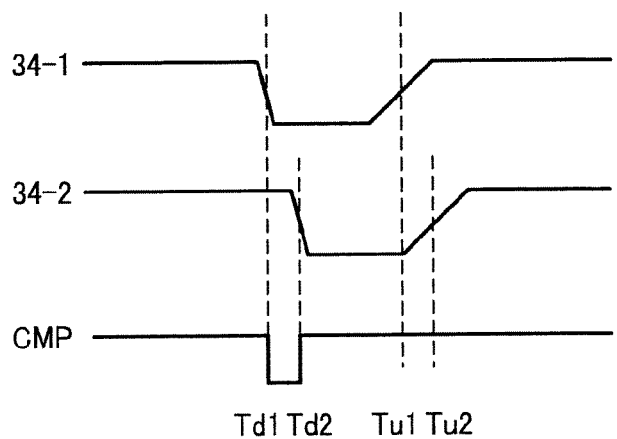
FIG. 29 is an explanatory view illustrating a light beam detection by the light beam detection device.

FIG. 29 is a timing chart illustrating output signals of the detecting portions 34-1, 34-2 of the light detector 30, that is, output signals which are output by the detecting portion 34-1, 34-2 of the light detector 30 when the beams C1, C2 pass the light receiving portions 35-1, 35-2, respectively.

The output signal of the detecting portion 34-1 of the light detector 30 when the beam C1 passes an edge portion at the scanning start side of the light receiving portion 35-1, that is, the left side edge portion of the light receiving portion 35-1 in FIG. 28 falls or trails from a High state to a Low state at the timing of Td1 and that when the beam C1 passes an edge portion at the scanning end side of the light receiving portion 35-1, that is, the right side edge portion of the light receiving portion 35-1 in FIG. 28 stands up or rises from the Low state to the High state at the timing of Tu1. If a passing position of the beam C1 on the light receiving portion 35-1 deviates in the sub scanning direction, the timings Td1 and Tu1 are not varied because the light receiving portion 35-1 has the edge portion to detect the light beam, which is parallel to the sub scanning direction.

As shown in FIG. 28, since the longitudinal direction of the detecting portion 84-2 of the light detector 30 is inclinably disposed in relation to the sub scanning direction, when the passing position of the separated beam C2 with which the light receiving portion 35-2 is scanned is varied in the sub scanning direction, the rising timing Td2 and the falling timing Tu2 of the output of the detecting portion 34-2 of the light detector 30 are varied.

Figure 30:
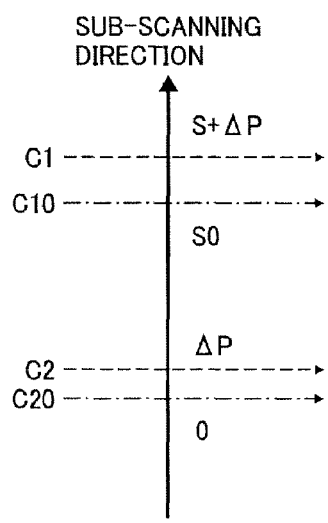
FIG. 30 is an explanatory view illustrating a light beam detection by the light beam detection device.

FIG. 30 is a view illustrating a detection method for detecting a deviation of the position of the incident light beam emitted into the diffraction optical element 33 of the light beam detection device 31 in the sub scanning direction That is, when the incident position of the light beam is a reference position in the sub scanning direction, the light beam emitted into the diffraction optical element 33 as the separation optical system 29 is separated into the two beams C10, C20. The diffraction optical element 33 separates the incident light beam into the two beams with the diffraction orders m=0 and m=−1 and satisfies at least the conditions (1), (2), and more preferably further the conditions (3), (4). The beam C20 is a beam with the diffraction order m=0 and the beam C10 is a beam with the diffraction order m=−1.

If the separated beams C10, C20 have an interval S0 in the sub scanning direction on the light detection surfaces where the light receiving portions 35-1, 35-2 are disposed and the position of the beam C20 in the sub scanning direction is equal to zero, the position of the beam C10 in the sub scanning direction is S0 as shown by a solid line in FIG. 30.

With the deviation of the incident position of the light beam in the sub scanning direction, the light beam emitted into the diffraction optical element 33 as the separation optical system 29 is separated into the two beams C1, C2. The beam C1 is a beam, which is obtained by modifying the beam C10 with the diffraction angle and the beam C2 is a beam, which is obtained by modifying the beam C20 with the diffraction angle.

Figure 31:
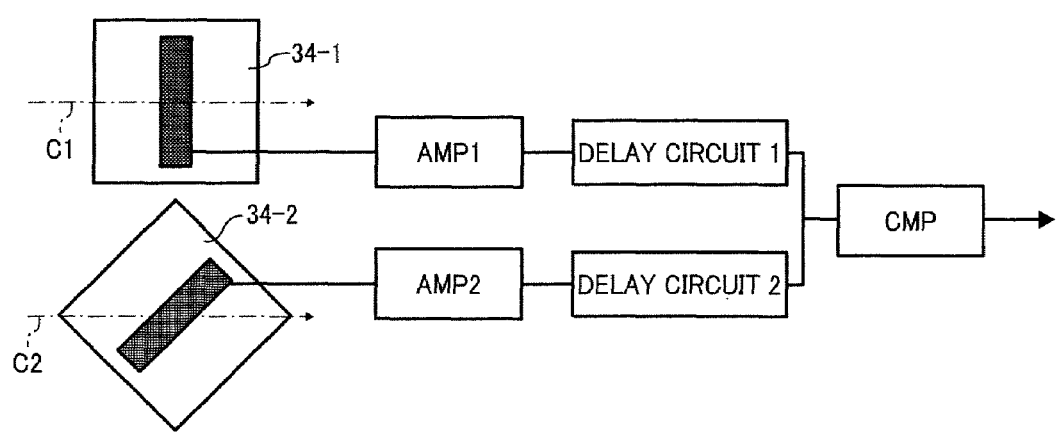
FIG. 31 is an explanatory view illustrating a light beam detection by the light beam detection device.

FIG. 31 is a view illustrating a control circuit.

The timings Td1, Td2 where the beams C1, C2 are emitted into the detecting portions 34-1, 34-2 of the light detector 30 differ from each other, that is, Td1≠Td2. The beams C10, C20 are determined by the light beam as a reference and therefore, in accordance with the timings Td1, Td2, delay times in delay circuits 1, 2 are adjusted such that the timings Td1, Td2 after the timings are delayed by the delay circuits 1,2 are in a state of Td1=Td2.

In the control circuit shown in FIG. 31, after the outputs from the detecting portions 34-1, 34-2 of the light detector 30 are respectively amplified by amplifiers AMP1, AMP2, the delay times of the delay circuits are set such that Td1=Td2, Then, difference between the falling timings Td1, Td2 of the two signals is measured by a comparator CMP. Since the falling timings of the detecting portions 34-1, 34-2 of the light detector 30 are more sharply detected than the rising timings thereof, the timings Td1, Td2 are used so that the accurate detection can be achieved. That is to say, as the edge portions at the detection sides to detect the beams C1, C2 by the light receiving portions 35-1, 35-2 of the light detector 30, the edge portions at the scanning start side which is a left side edge portion in FIG. 28 is used.

In relation to the position of the light beam as the reference position 0 in the sub scanning direction, the light beam detection device is adjusted such that the timings Td1, Td2 are set in a state of Td1=Td2. Accordingly, only the case where the position of the light beam in the sub scanning direction is changed by ΔP according to factors such as a temporal change or an environmental change is considered. The beams C1, C2 are separated by the diffraction optical element 33 such that the beam C2 is deviated from the reference position 0 by ΔP and the beam C1 is deviated from the position S0 by S+ΔP in the sub scanning direction on the light detection surfaces, as shown in FIG. 30.

S=S0+ΔS and the beam C1 is deviated from the reference position S where the beam C10 passes by ΔS+ΔP in the sub scanning direction. The value ΔS is primarily determined according to characteristic of the diffraction optical element 33. In the illustrated example, the beams C1, C2 are deviated in the sub scanning direction in accordance with the variation of the incident angle where the incident light beam is emitted. The deviation amount is determined as characteristic of the diffraction optical system 33, that is, the variation of the incident angle and the variations of the diffraction angles of the beams C1, C2, and preliminarily determined as a linear functional relationship of $\Delta S=F(\Delta P)$. The relationship determined as mentioned above is memorized.

When the position of the deflected light beam is deviated by $\Delta P$ in the sub scanning direction, in the falling timings of the outputs obtained by the detecting portions 34-1, 34-2 of the light detector 30, since the output of the detecting portion 34-1 of the light detector 30 is not varied, the timing Td1 is nut varied. Since the light receiving portion 35-2 of the detecting portion 34-2 is inclined to the sub scanning direction, when the position of the beam C2 is deviated in the sub scanning direction, the falling timing of the output signal is changed to the timing Td2'.

In this time, the time difference $\Delta T=Td2'-Td2$ corresponds to the positional difference of the beam C2 on the light detection surface in the sub scanning direction and the positional difference $\Delta P$ can be detected by the relationship of $\Delta P=F(\Delta S)$.

In the embodiments shown in FIGS. 27 to 31, the incident light beam is separated into the two beams and maximum light amount of the separated beam is a half of the amount of the light beam. As mentioned above, in order to achieve the large light amount, the light beam is preferably separated into two beams by the diffraction optical element 33. The large light amount is effective regarding S/N ratio in the light detector 30.

In the embodiments shown in FIGS. 27 to 31, as shown in FIG. 27, the light beam detection device 31, which includes the diffraction optical element 33 to separate the deflected light beam into the two beams C1, C2 in the sub scanning direction and the detecting portions 34-1, 34-2 of the light detector 30 each having the light receiving portion disposed in the sub scanning direction, is used. Using difference between the layout forms of the two detecting portions 34-1, 34-2 of the light detector 30, the position of the light beam emitted into the light beam detection device 31 in the sub scanning direction is detected in accordance with the detection method shown in FIG. 30.

As shown in FIG. 27, of the beams separated by the diffraction optical element 33, the beam C2 is emitted into the detecting portion 34-2 of the light detector 30 and the beam C1 is emitted into the detecting portion 34-1. In the beams C1, C2, the beam C1 corresponds to the diffraction order m=−1 and the beam C2 corresponds to the diffraction order m=0. That is, the beam C2 is zero-order light.

As described in the above embodiments, if the semiconductor laser or the semiconductor laser array is used as the light source, the wavelength of the emitted laser light is varied with temperature of the light source and random variation of the wavelength occurs due to mode hopping phennomena in the wavelength. When the wavelength $\lambda$ of the light beam emitted into the diffraction optical element 33 is varied, the diffraction angle of the beam C1 with the diffraction order m=−1 is varied.

When the wavelength of the light beam is varied, although the position of the light beam emitted into the diffraction optical element 33 is not changed in the sub scanning direction, the diffraction angle of the beam C1 is changed so that the incident position of the light beam emitted into the detecting portion 34-1 is changed.

However, the light receiving portion 35-1 of the detecting portion 34-1 where the beam C1 of the diffraction order m=−1 is emitted is in a rectangular form extending in the sub scanning direction and both end side edges thereof in the main scanning direction are parallel to each other. Accordingly, if the incident position of the beam C is deviated in the sub scanning direction, the output of the detecting portion 34-1 is not varied. On the other hand, the beam C2 emitted into the detecting portion 34-2 is the zero-order light so that the output is not affected by the variation of the wavelength. Accordingly, in the above described embodiments, the light beam can be detected without the affection of the variation of the wavelength of the light beam to be detected.

The synchronization detection to adjust the timing to the scanning start position in the main scanning direction in the light beam detection device 31 is performed by adjusting the timing to the scanning start position in the main scanning direction by use of the output timing Td1 of the detecting portion 34-1 as the reference.

Figure 32:
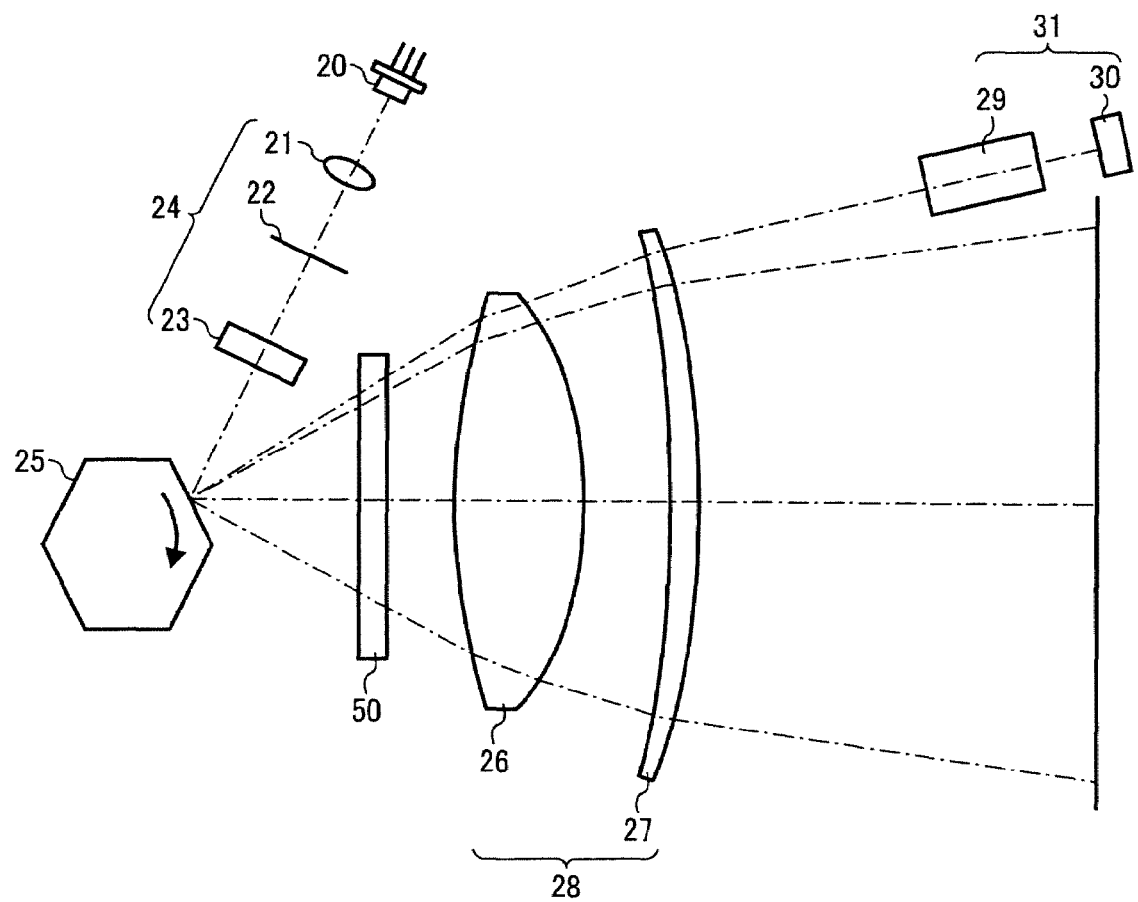
FIG. 32 is an explanatory view illustrating another example of an optical layout of an optical scanner according to an embodiment of the present invention.

FIG. 32 its a view illustrating another embodiment of the optical scanner of the present invention. For the sake of simplicity of the explanation, with respect to the elements which are not confused, the same reference numbers are used for the corresponding elements and the explanation with respect to FIG. 26 is incorporated.

The embodiment shown in FIG. 82 is an embodiment where a position correction unit 50 to correct the position of the light beam in the sub scanning direction is added in addition to the embodiment shown in FIG. 26.

The position correction unit 50 is disposed between the light deflection unit 25 and the scanning-imaging optical system 28 and has a function of correcting the position of the light beam which is led to the effective image forming area in the sub scanning direction based on the position of the light beam in the sub scanning direction, which is detected by the light beam detection device 31. A layout position of the position correction unit 50 is not limited to the position shown in FIG. 32 and the position correction unit 50 can be disposed at any position between the light source unit 30 and the surface to be scanned.

Figure 33:
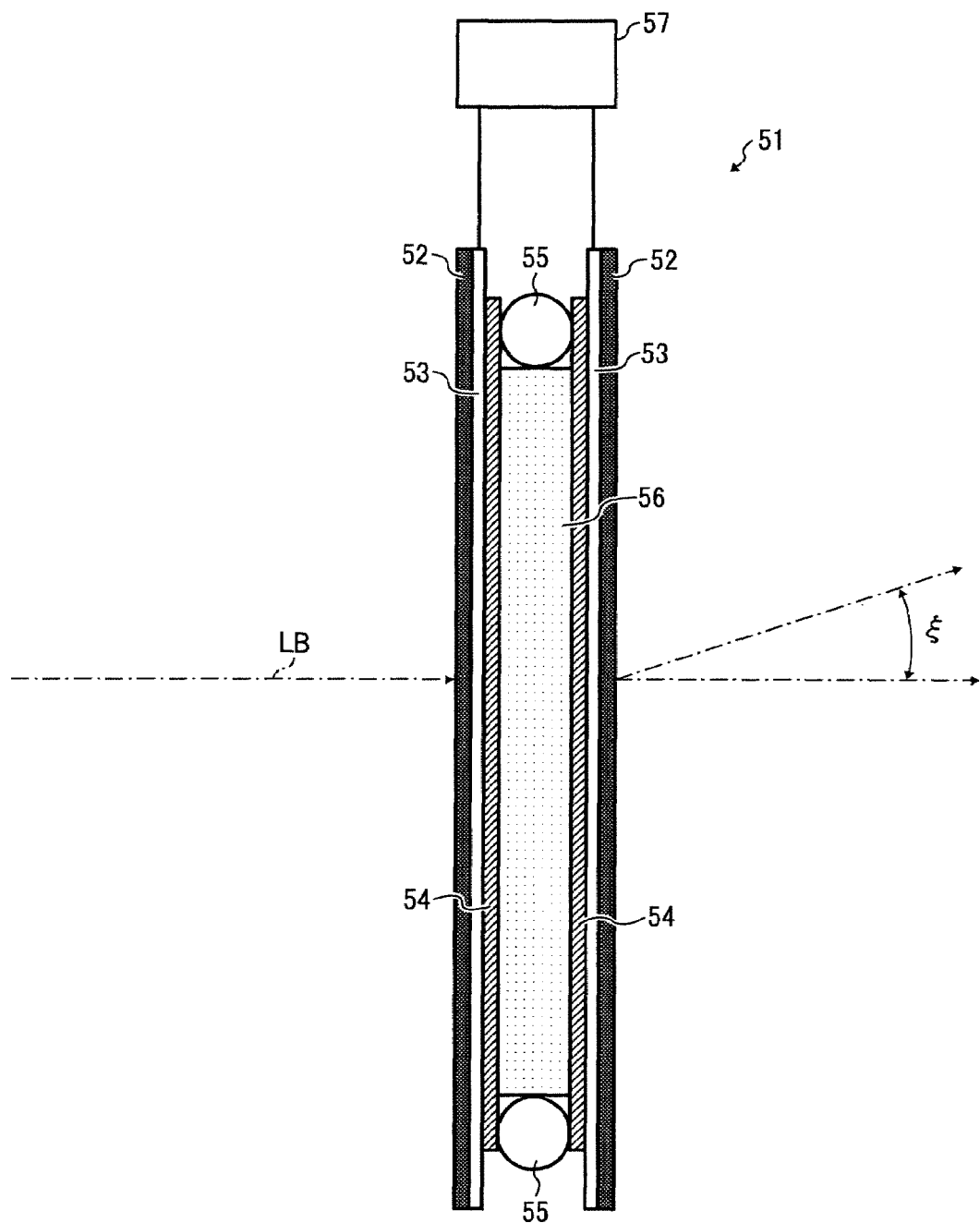
FIG. 33 is an explanatory view illustrating a position correction unit of the optical scanner shown in FIG. 32.

FIG. 33 is a view illustrating a liquid-crystal deflection element 51 as an example of the position correction unit 50.

The liquid-crystal deflection element 51 is an element to deflect the light beam by an optic effect of liquid crystal and is configured to deflect the incident light beam LB in the sub scanning direction (upward and downward directions of FIG. 33).

The liquid-crystal deflection element 51 includes a pair of transparent substrates 52 which are disposed parallel to each other, a pair of transparent electrodes 53 which are disposed on facing surfaces of the pair of transparent substrates 52, respectively, a pair of deflection membranes 54 which are integrally-disposed on facing surfaces of the pair of the transparent electrodes 53, spacers 55 to provide a predetermined interval between the pair of deflection membranes 54, and a liquid-crystal layer 56 which is filled in the interval which is sealed by the pair of deflection membranes 54 and the spacers 55 and held therebetween. The liquid-crystal element 51 can adjust a deflection angle $\xi$ by adjusting voltage applied to the pair of transparent electrodes 53 from a driving circuit 57.

The position of the light beam can be corrected to a predetermined position in the sub scanning direction by controlling the voltage applied to the driving circuit 57 based on the position of the light beam in the sub scanning direction, which is detected by the light beam detection device 31.

Figure 34:
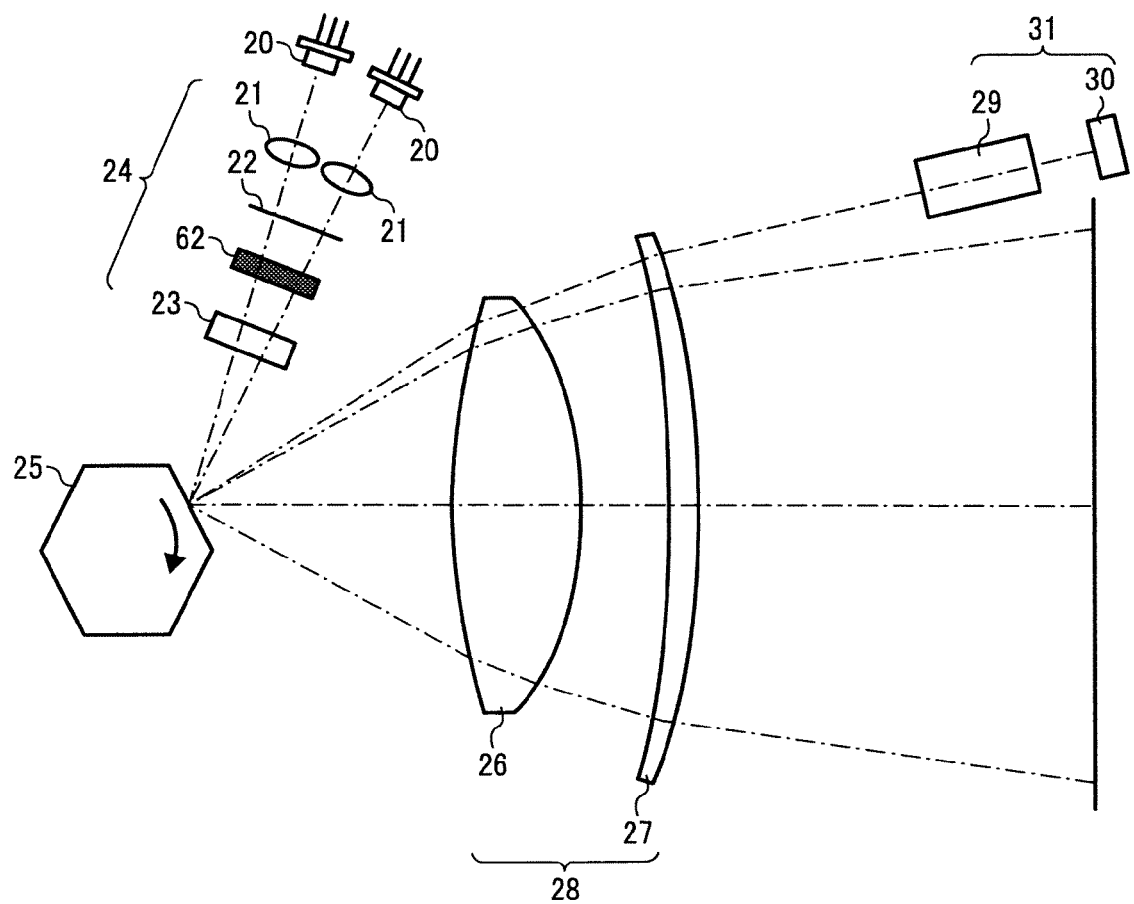
FIG. 34 is an explanatory view illustrating another example of an optical layout of an optical scanner according to an embodiment of the present invention.

FIG. 34 is a view illustrating an example of the optical scanner which generates a plurality of light beams.

In the optical scanner shown in FIG. 34, the light source unit 20 including two semiconductor lasers, and two coupling lenses 21 each corresponding to each of light beams emitted from each of the semiconductor lasers. Each coupled light beam is partially shaded by the aperture 22 and then converged in the sub scanning direction by the cylindrical lens 23 via an interval correction unit 62 so as to be imaged in the vicinity of the deflection surface of the light deflection unit 25 as a linear image extending in the main scanning direction.

Due to the rotation of the light deflection unit 25 at the constant speed, the two light beams are deflected and two light spots are formed on the surfaces to be scanned by the two scanning-imaging lenses 26, 27 included in the scanning-imaging optical system 28. The light beam directed to outside of the effective image forming area in the main scanning direction via the scanning-imaging optical system 28 is emitted to the light detection unit 31 so that the position of the light beam is detected.

The layout of the interval correction unit 62 is not limited to the position shown in FIG. 34, and the interval correction unit 62 can be disposed at any position between the light source unit and the light deflection unit 25.

Figure 35:
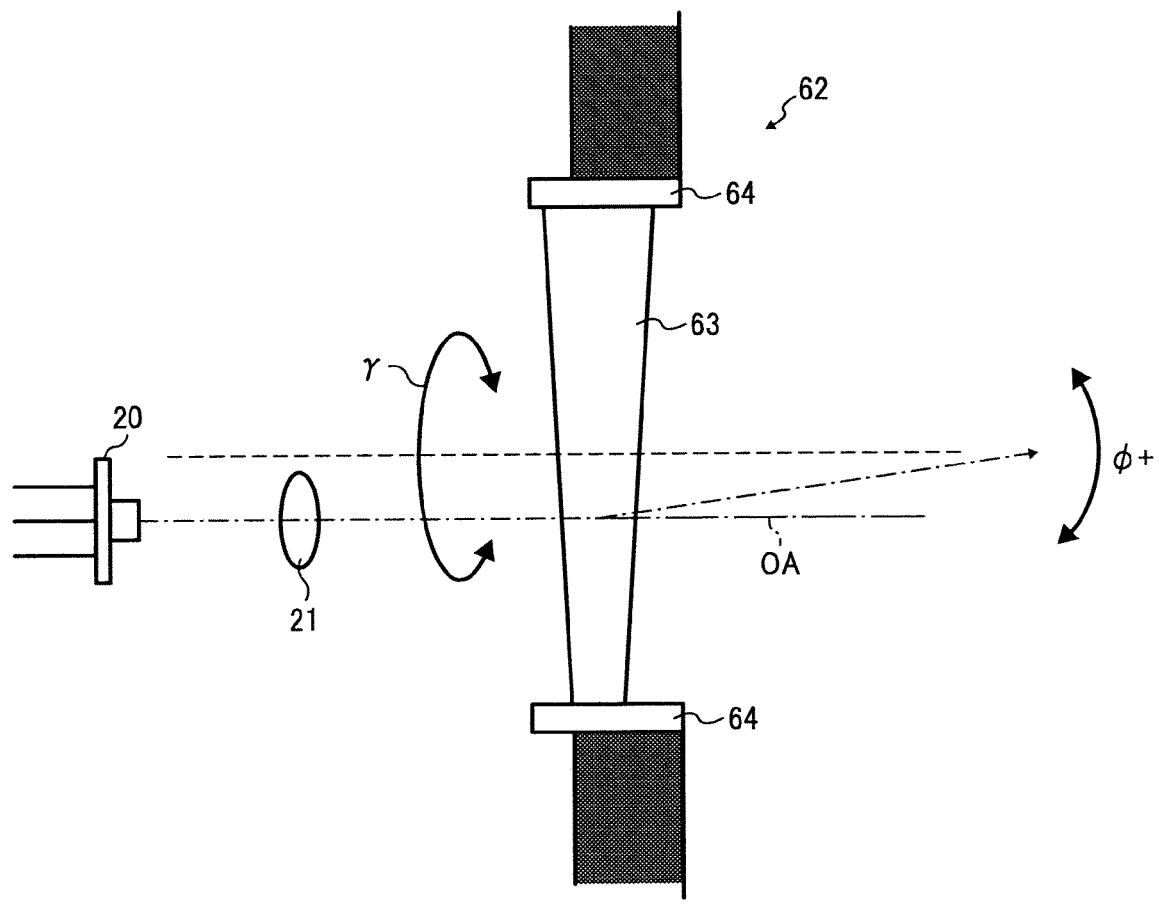
FIG. 35 is an explanatory view illustrating an interval correction unit of the optical scanner shown in FIG. 34.

FIG. 35 is a view illustrating an example of the interval correction unit 62. The interval correction unit 62 has a prism 63 in a wedge shape. The prism 63 is held in a wedge shape (in a trapezoidal shape) in section on a base 64. If the coupling lens 21 has an optical axis shown by the reference. number OA, the prism 63 is rotated in a direction of y about the optical axis OA so that the incident light beam can be deflected by a deflection angle which is in a range having a maximum deflection angle $\phi$ and therefore the position of the light spot formed on the surface to be scanned can be corrected in the sub scanning direction.

That is, by rotating and controlling the wedge-shape prism 63 through a not-shown rotating unit based on an interval between the two light beams in the sub scanning direction, which is detected by the light beam detection device 31, the position of the light beam is corrected to correct the interval between the two light beams in the sub scanning direction.

As the light beam emitted into the light beam detection device 31, as shown in FIGS. 26, 34, the light beam after passing the scanning-imaging optical system 28 can be used and the light beam deflected by the light deflection unit 25 without passing through the scanning-imaging optical system 28 can be directly emitted. However, in the latter, the positional change of the light beam due to the scanning-imaging optical system is not detected. Furthermore, because the light beam does not pass the scanning-imaging optical system 28, in order to lead the light beam which is deflected by the light deflection unit 25 to the light detector 30, the separation optical system is required to have a certain level of an imaging function. Therefore, it is preferable to emit the light beam after passing the scanning-imaging optical system 28 to the light beam detection device 31.

In the light beam detection device 31, as shown in FIG. 26, the light beam which is directed outside of the effective image forming area can be emitted, and the light which is directed within the effective image forming area can be used. However, in the latter case, the scanning of the effective image forming area is required to be stopped and the light beam detection device 31 is required to be moved to a position where the light beam used to scan the effective image forming area can be detected so that the moving mechanism is complicated. On the other hand, if the light beam outside of the effective image forming area is used, when scanning the effective image forming area, the position of the light beam can be detected while writing with the light.

In addition, as described above, the light amount of each of the two beams emitted into the light detector 30 is small and, at a maximum, the amount of each of the two beams is a half of the amount of the light beam. In the case where the light beam detection is performed outside of the effective image forming area, only when the light beam is detected by the light beam detection device, the light emitting output of the light beam can be adjusted in accordance with the light receiving characteristic and sensitivity of the light detector 30 so that the detection accuracy can be improved. The light beam detection device 31 can be used as the synchronization detection unit to determine the scanning start position in the main scanning direction.

Figure 36:
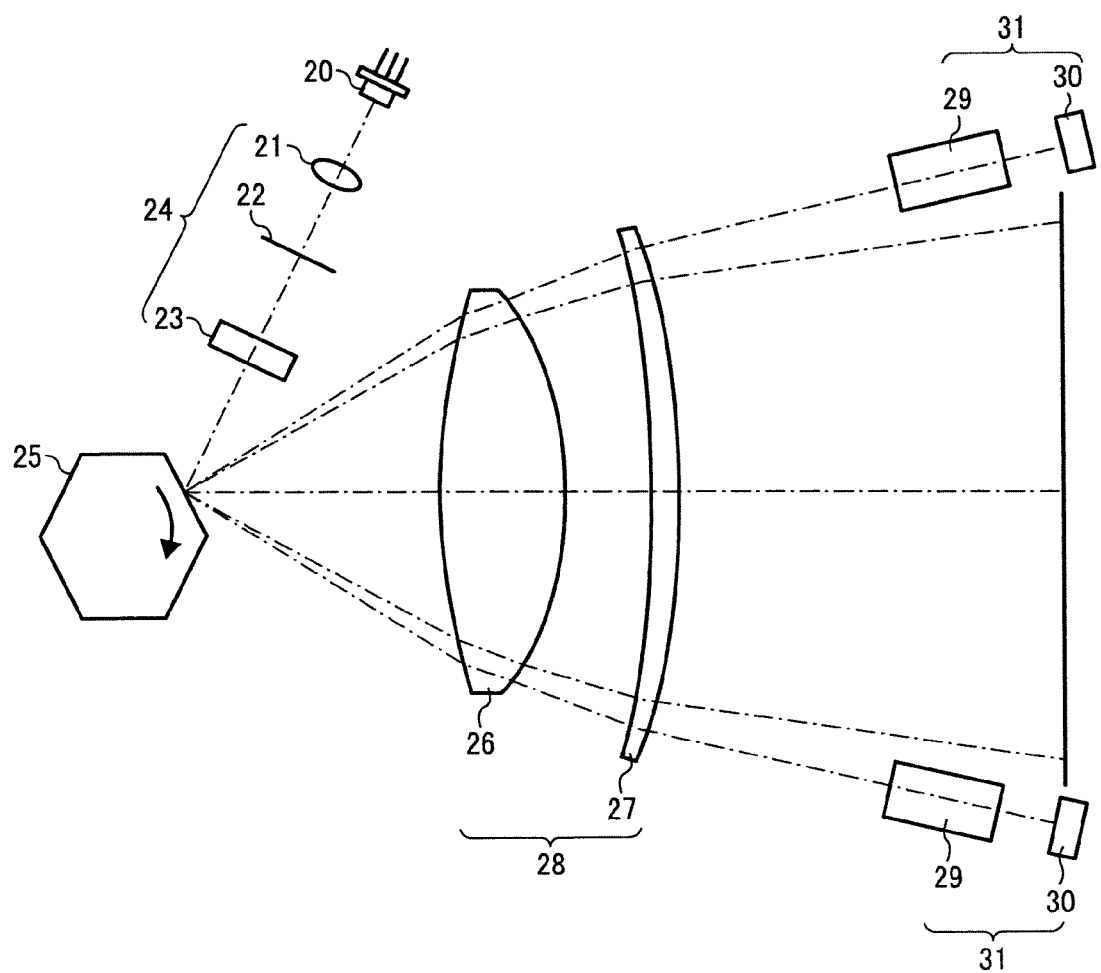
FIG. 36 is an explanatory view illustrating another example of an optical layout of an optical scanner according to an embodiment of the present invention.

FIG. 36 shows a modified example of the embodiment shown in FIG. 26, where a pair of light beam detection devices 31 having the same configuration as that shown in FIG. 26 are provided at the scanning start side and the scanning end side of the surface to be scanned with the deflected light beam. In FIG. 36, although the two light beam detection devices 31 are provided at the both end out of the effective image forming area, the two light beam detection devices 31 can be disposed within the effective image forming area. As mentioned above, the two light beam detection devices are provided in the main scanning direction so that the characteristics of the scanning lines, such as inclination of the scanning lines, curve of the scanning lines, or the like can be detected and therefore high accurate light scanning can be performed.

In addition, in a tandem-type color image forming apparatus, in the case where the difference between timings at both end sides of the effective image forming area corresponding to each color is detected, a driving clock frequency of the light beam from the light source unit can be adjusted such that a width of each effective image forming area corresponding to each color is equal to each other.

In the above examples, although the laser printer 100 is explained as the image forming apparatus, the image forming apparatus is not limited thereto and a digital copying machine, a facsimile device, a plotter, a digital complex machine such as a device including a hybrid functionality of a copying function, a facsimile function, a printer function, a plotter function, a scanning function, and the like can be used.

As the image forming apparatus according to an embodiment of the present invention, a color-image forming apparatus to form a color image can be used, more particularly, a tandem-type color image forming apparatus where a photoconductive drum is provided for image information corresponding to each color image can be used.

Figure 37:
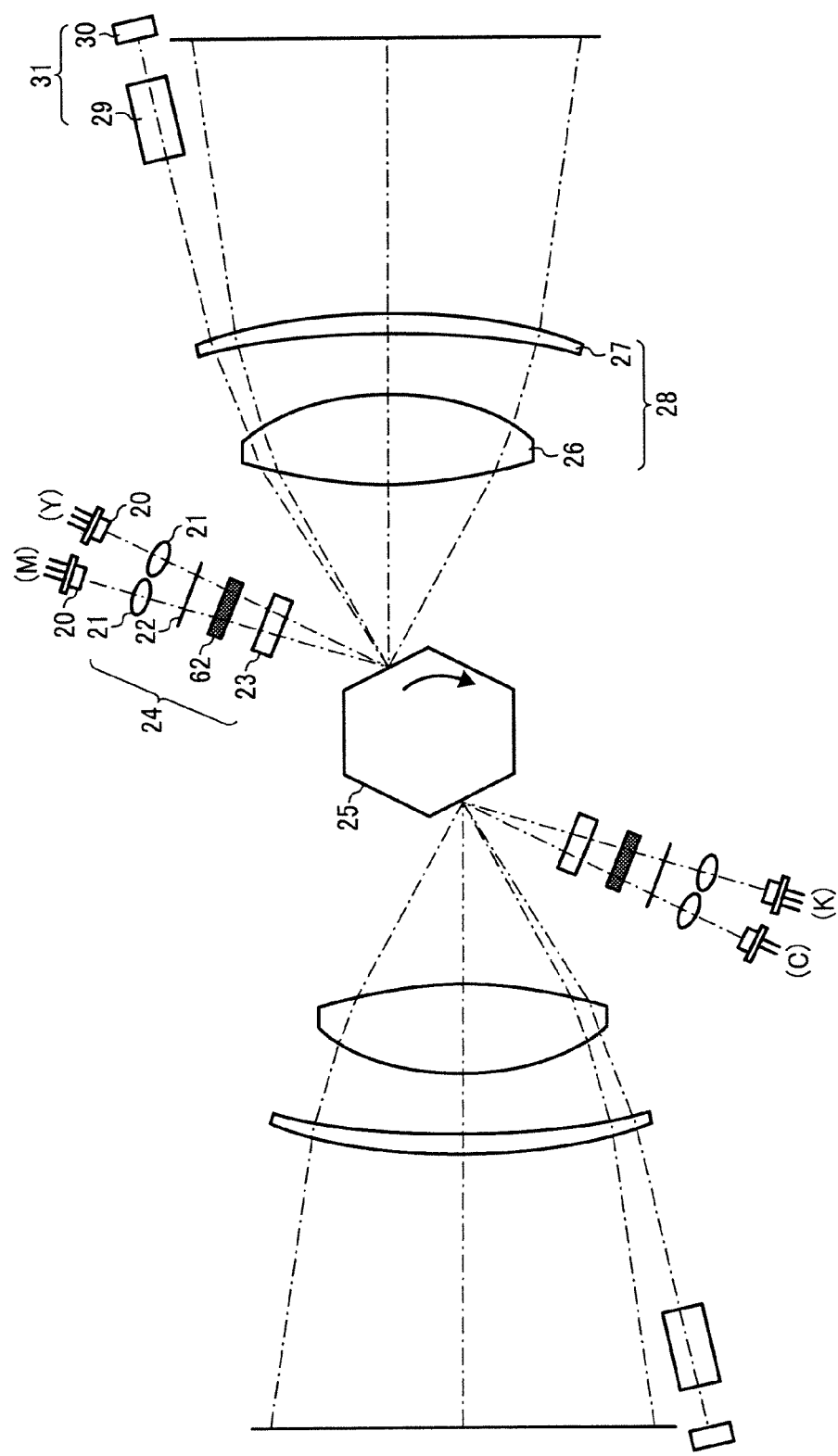
FIG. 37 is an explanatory view illustrating another example of an optical layout of an optical scanner according to an embodiment of the present invention.

FIG. 37 shows an optical scanner used in a tandem-type color image forming apparatus, in which the optical scanner to perform the scanning with two light beams as shown in FIG. 34 is used to perform the scanning of four photoconductive drums each corresponding to yellow Y, magenta M, cyan C, and black K with four light beams. In the above optical scanner, the two optical systems shown in FIG. 34 are rotationally-symmetrically disposed about the commonly-used light deflection unit 25. In addition, in the actual image forming apparatus, although a reflection mirror is disposed between the scanning-imaging lens 26 or 27 and the surface to be scanned to lead each light beam to the corresponding photoconductive drum, the reflection mirror is omitted in FIG. 37.

Furthermore, in the optical scanner shown in FIG. 37, the light source units 20 of the optical scanner shown in FIG. 34 are replaced by multi-beam light sources. In this case, in the tandem-type color image forming apparatus, the optical scanner can scan the photoconductive drums each corresponding to each color of Y, M, C, K with four light beams as the multi beams as well as the case shown in FIG. 34.

Figure 38:
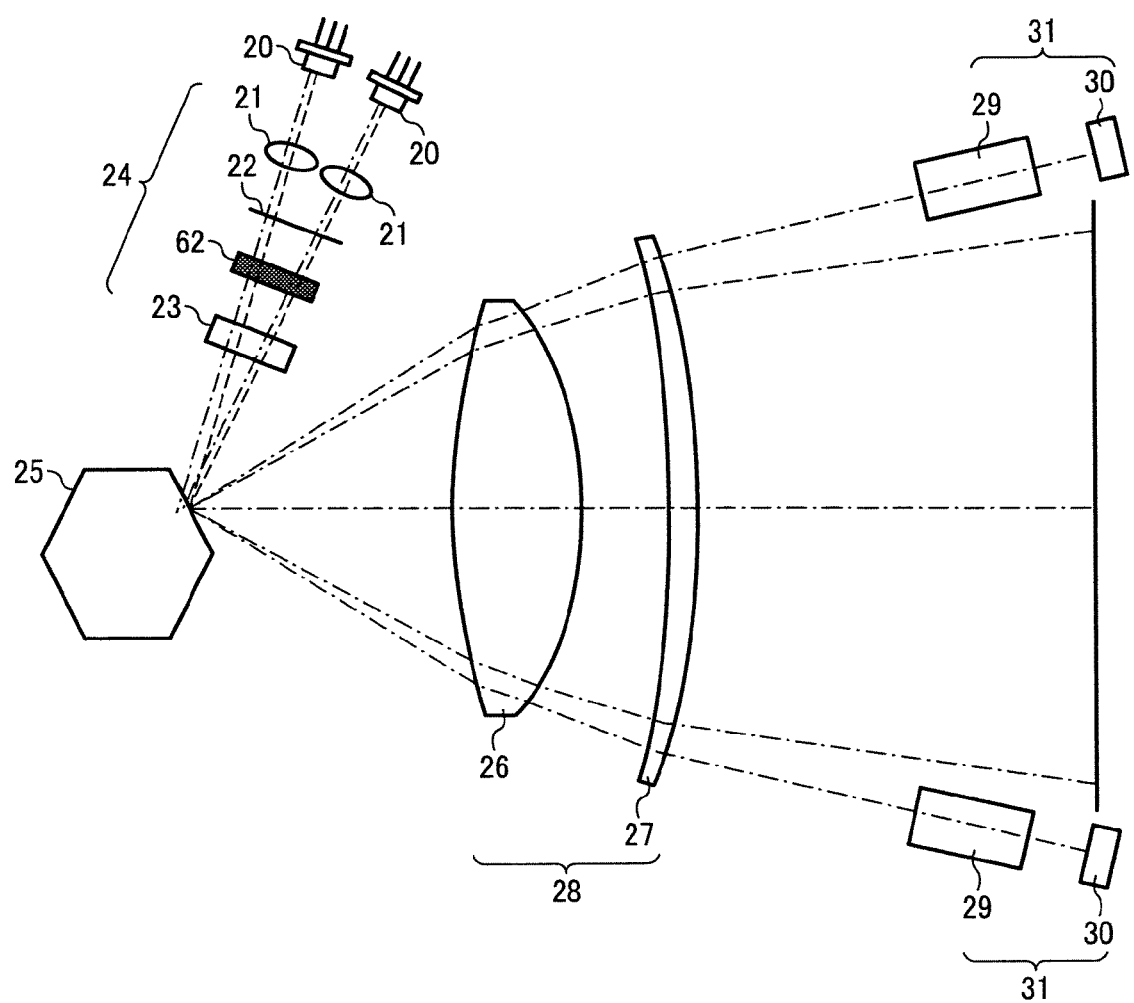
FIG. 38 is an explanatory view illustrating another example of an optical layout of an optical scanner according to an embodiment of the present invention.

FIG. 38 shows an example of the optical scanner in which the two light beam detection devices 31 are provided at both sides and outside of the effective image forming area in relation to the example of the optical scanner shown in FIG. 34.

Even in the optical scanner shown in FIG. 38, the multi-beam light source having two light emitting points is used instead of the single beam light source to scan each photoconductive drum with two light beams, that is, eight light beams in total, which are deflected by the light deflection unit 25. Furthermore, if the laser-array light source having four light emitting points is used, sixteen light beams are emitted into the light deflection unit 25 to scan each photoconductive drum with four light beams. Thereby, further high speed scanning can be achieved.

In the above-mentioned embodiments, each of the plurality of detecting portions 34-1, 34-2 are configured to have the same form and the same structure and therefore each of the detecting portions 34-1, 34-2 of the light detector 30 can have the same characteristics so that the detection accuracy can be obtained and operation and construction of the control circuit can be easily performed. Accordingly, stable detection can be obtained.

The light beam detection device has two detecting portions 34-1, 34-2 of the light detector 30 and this is the minimum number of the detecting portions 34-1, 34-2 of the light detector 30 to detect the position in the sub scanning direction. The light beam is preferably separated into two beams 80 that enough light amount can be obtained.

In addition, in the above mentioned embodiments of the optical scanner, if the optical scanner has the interval correction unit to correct the intervals between the plurality of light beams, the pitches of the scanning lines can be corrected by performing feedback control with the interval correction unit based on the intervals of the plurality of light beams, which are detected by the light beam detection device. Accordingly, highly fine and high speed image forming apparatus can be obtained.

In the above optical scanner, if the interval correction unit includes at leas one optical member which is disposed on the light path between the light source unit and the light deflection unit and a control mechanism which controls a positional change or a physical change of the optical member, the control mechanism to control the positional change of the passive optical member or the physical change of the active optical member is provided so that the position of the light beam can be corrected. Furthermore, in the case where the interval correction unit is disposed before the light deflection unit, the small optical member can be used as the interval correction unit.

In the optical scanner according to the embodiments of the present invention, in the case where the light beam after passing the scanning-imaging optical system is emitted into the light beam detection device, the positional change of the light beam due to the scanning-imaging optical system as well as the positional change of the light beam actually occurring within the effective image forming area can be detected.

In the case where the light beam after passing the scanning-imaging optical system is used, the separation optical system of the light beam detection device is only required to have beam separation effect, so that the configuration can be simplified.

In the case where the light beam out of the effective image forming area is emitted into the light detection unit, the light beam emitted into the light beam detection device is the light beam out of the effective image forming apparatus so that the position of the light beam can be detected in real time and therefore the high accuracy of the feedback control can be achieved. Furthermore, the down time of the image forming apparatus, which is required for the detection is not necessary. In the above optical scanner, only when the light beam is detected by the light beam detection device, the output of the light beam can be adjusted. In this case, the emitting output of the light beam can be adjusted in accordance with the incident energy characteristic or the sensitivity of the light detector 30 without affecting the effective image forming area so that the detection accuracy can be improved.

In the case where the two light beam detection devices are provided in the main scanning direction, the characteristics with respect to the scanning lines such as the inclination or the curve of the scanning lines can be detected so that further high accuracy of the scanning can be achieved. If the correction unit is provided, by the feedback control, further high fine image forming apparatus can be obtained and the driving clock frequency of the light beam from the light source unit is adjusted such that the width of the effective image forming area of each color is equal to each other when the color image forming is performed so that the all width magnification error can be reduced.

If the synchronization detection unit to determine the scanning start position in the main scanning direction is provided in the light beam detection device, the detection unit can be integrally provided so that the small-size and low-cost optical scanner can be obtained.

As mentioned above, according to the embodiments of the present invention, the new diffraction optical element and the light beam detection device, the optical scanner, and the image forming apparatus using the diffraction optical element can be obtained.

The diffraction optical element can separate the light beam with a large separation angle and can be effectively applied in any deflected state. Accordingly, the diffraction optical element can be commonly-used in various optical devices such as the optical scanner and the image forming apparatus so that the low cost optical devices can be obtained.

In the light beam detection device according to an embodiment of the present invention, at least one first light-receiving portion of the plurality of light receiving portions is disposed in a state where outputs obtained from the at least one first light-receiving portion are not varied depending on an incident position of the light beam in the predetermined direction and at least one second light-receiving portion of the plurality of light receiving portions is disposed in a state where outputs obtained from the at least one second light-receiving portion are varied with time depending on the incident position of the light beam in the predetermined direction.

Due to the above light beam detection device, the position of the deflected light beam on the surface to be scanned in the sub scanning direction and the variation of the deflected light beam can be detected. Furthermore, a scanning start position can be controlled by detecting the light beam at a scanning start side of the surface to be scanned.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An optical element for diffracting a light beam, comprising a diffractive surface having a one-dimensional periodic structure;

wherein the periodic structure and transmissive diffraction efficiencies T'p(m) and T's(m) of p- and s-polarized lights on the diffractive surface in relation to a diffraction order m satisfy the following conditions:

$$0.5\lambda < P < 1.5\lambda \quad (1)$$

$$|\{T'p(m) - T's(m)\}/\{T'p(m) + T's(m)\}| < 0.1, \quad (2)$$

where P is a period of the periodic structure, and $\lambda$ is a wavelength of the used light beam.

2. The diffraction optical element according to claim 1, wherein
the used light beam is separated into two diffracted beams by use of the diffraction orders of m=0 and −1.

3. The diffraction optical element according to claim 1, wherein
the light beam is emitted into the diffractive surface with an incident angle of about an angle $\theta_0$ in relation to the diffractive surface and the angle $\theta_0$ satisfies the following condition:

$$\sin \theta_0 = \lambda/2P. \quad (3)$$

4. The diffraction optical element according to claim 1, wherein
an average transmissive diffraction efficiency T'(m) of T'p(m) and T's(m) is defined by the following equation:

$$T'(m) = \{T'p(m) + T's(m)\}/2; \text{ and}$$

the average transmission diffraction efficiency T'(m) satisfies the following condition:

$$|\{T'(0) - T'(-1)\}/\{T'(0) + T'(-1)\}| < 0.1. \quad (4)$$

5. The diffraction optical element according to claim 1, wherein a cross-sectional shape of the one-dimensional periodical structure is in a substantially rectangular-wave form.

6. A light beam detection device which detects a light beam, comprising:
the diffraction optical element according to claim 1, which is configured to diffract the light beam to separate the light beam into a plurality of diffracted beams in a predetermined direction; and
a light detector configured to have a plurality of light-receiving portions which are disposed in the predetermined direction and detect separately the plurality of diffracted beams.

7. The light beam detection device according to claim 6, wherein at least one first light-receiving portion of the plurality of light receiving portions is disposed in a state where outputs obtained from the at least one first light-receiving portion are not varied depending on an incident position of the light beam in the predetermined direction; and
at least one second light-receiving portion of the plurality of light receiving portions is disposed in a state where outputs obtained from the at least one second light-receiving portion are varied with time depending on the incident position of the light beam in the predetermined direction.

8. The light beam detection device according to claim 7, wherein the light beam is deflected in a main scanning direction and the predetermined direction is a sub scanning direction perpendicular to the main scanning direction.

9. An optical scanner which scans a surface to be scanned by deflecting a light beam, comprising
the light beam detection device according to claim 6, which is disposed so as to detect the light beam on at least scanning start side of the surface to be scanned.

10. An image forming apparatus which forms an image by use of the optical scanner according to claim 9.

* * * * *